(12) United States Patent
Bisotti et al.

(10) Patent No.: US 7,272,618 B1
(45) Date of Patent: Sep. 18, 2007

(54) METHOD AND APPARATUS FOR AUTOMATED INFORMATION RETRIEVAL AND COMPONENT ORDERING

(75) Inventors: John Francesco Bisotti, May's Lick, KY (US); Daniel G. Fannin, West Union, OH (US); James Pierce Johnson, St. Charles, IL (US); Harold A. Fischer, Naperville, IL (US); James A. Parejko, Plainfield, IL (US); Michael Jay Stein, Aurora, IL (US)

(73) Assignee: Emerson Power Transmission Manufacturing LP, Maysville, KY (US)

(*) Notice: Subject to any disclaimer, the term of this patent is extended or adjusted under 35 U.S.C. 154(b) by 396 days.

(21) Appl. No.: 10/060,669

(22) Filed: Jan. 30, 2002

(51) Int. Cl.
*G06F 17/30* (2006.01)

(52) U.S. Cl. ....................... 707/104.1; 713/1

(58) Field of Classification Search ............. 707/1–10, 707/100, 101–104.1; 705/26; 340/572.1; 713/1
See application file for complete search history.

(56) References Cited

U.S. PATENT DOCUMENTS

| | | | |
|---|---|---|---|
| 5,825,651 A * | 10/1998 | Gupta et al. ............. 700/103 |
| 6,360,216 B1 * | 3/2002 | Hennessey et al. ........... 707/3 |
| 6,405,308 B1 * | 6/2002 | Gupta et al. ................. 713/1 |
| 6,552,663 B2 * | 4/2003 | Swartzel et al. ......... 340/572.1 |
| 6,658,424 B1 * | 12/2003 | Boehm et al. ............. 707/102 |
| 6,675,294 B1 * | 1/2004 | Gupta et al. ................. 713/1 |
| 6,728,685 B1 * | 4/2004 | Ahluwalia .................. 705/26 |
| 6,728,706 B2 * | 4/2004 | Aggarwal et al. ............ 707/5 |
| 6,751,615 B2 * | 6/2004 | Nisler et al. ................. 707/5 |

FOREIGN PATENT DOCUMENTS

| | | |
|---|---|---|
| WO | WO 01/96078 A2 | 12/2001 |
| WO | WO 02/10993 A2 | 2/2002 |

OTHER PUBLICATIONS

BP-88 "SealMaster Bearing Products" catalog. Pages 15-21, 124-126, 195-202-represents prior art in product selection. Pages 158-167-represents prior art in product interchange.

BMB-98 "Browning Mounted Bearings" catalog. Pages 256-275-represents prior art in product selection. Pages 152-255-represents prior art in product interchange.

Interchange Inc. CD-Rom Represents prior art in product interchange. Published by Interchange Inc., 4820 Park Glen Road, Minneapolis, MN 55416-5792.

"Bearing Manual" vol. 1 No. 2000, Represents prior art in product interchange. Published by Industrial Information Headquarters, Inc., 2601 West 16th Street-P.O. 6257, Broadview, IL 60153-4508.

I.B.I. Guide Bearings Represents prior art in product interchange, Published by Interchange Incorporated, P.O. Box 16244, Saint Louis Park, MN 55416.

* cited by examiner

*Primary Examiner*—Yicun Wu
(74) *Attorney, Agent, or Firm*—McDonnell Boehnen Hulbert & Berghoff LLP

(57) ABSTRACT

A system and method for determining information for system components includes a database, an interchanger subsystem, and a product selection subsystem. The database includes information concerning components. An interchanger subsystem receives product parameters from a selected one of the plurality of users. The product parameters specify features of a component. The interchanger subsystem determines a list of interchangeable substitute components from the information in the database. The product selection subsystem receives component information from a selected one of the plurality of users and determines a range of product offerings from the information in the database.

42 Claims, 33 Drawing Sheets

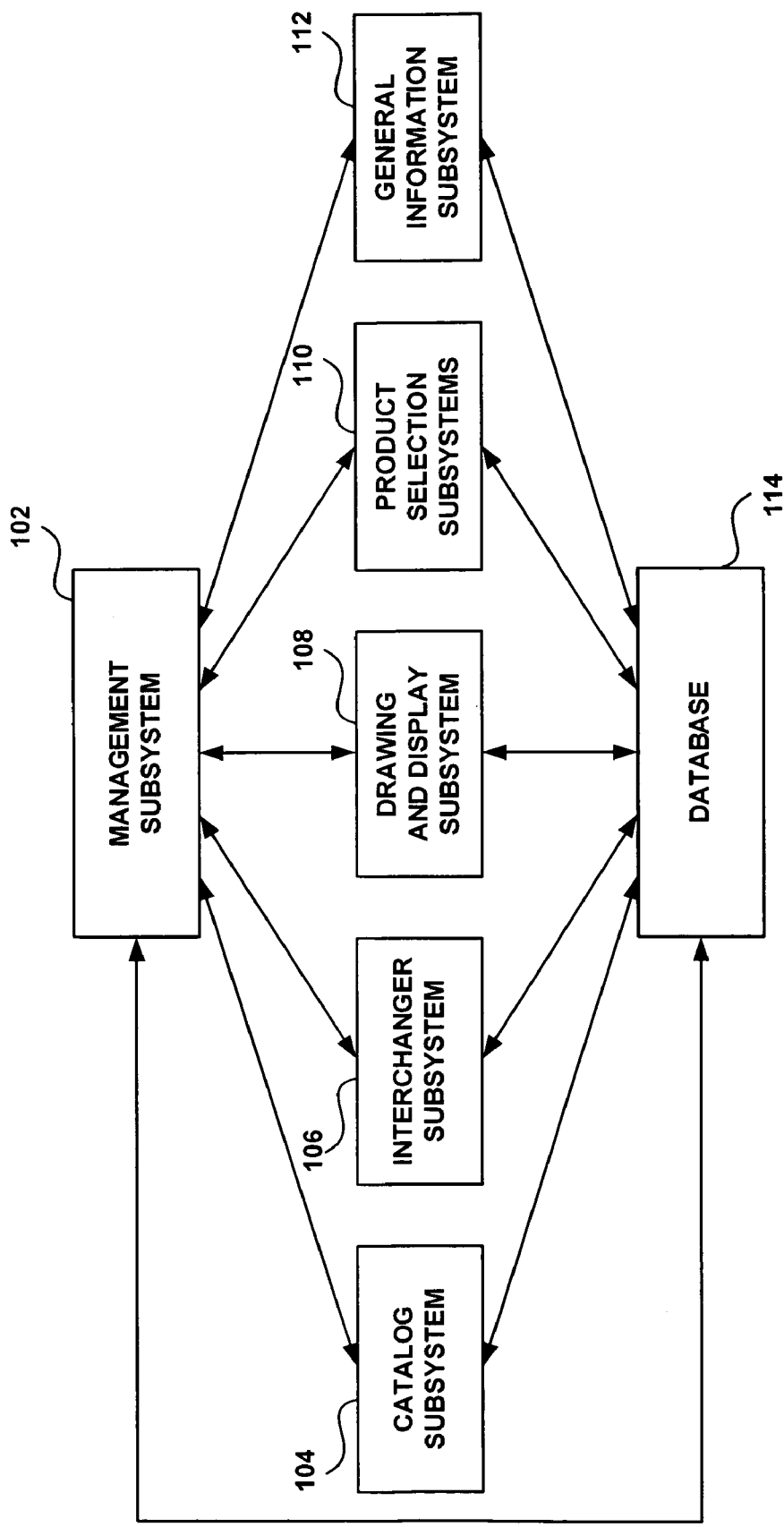

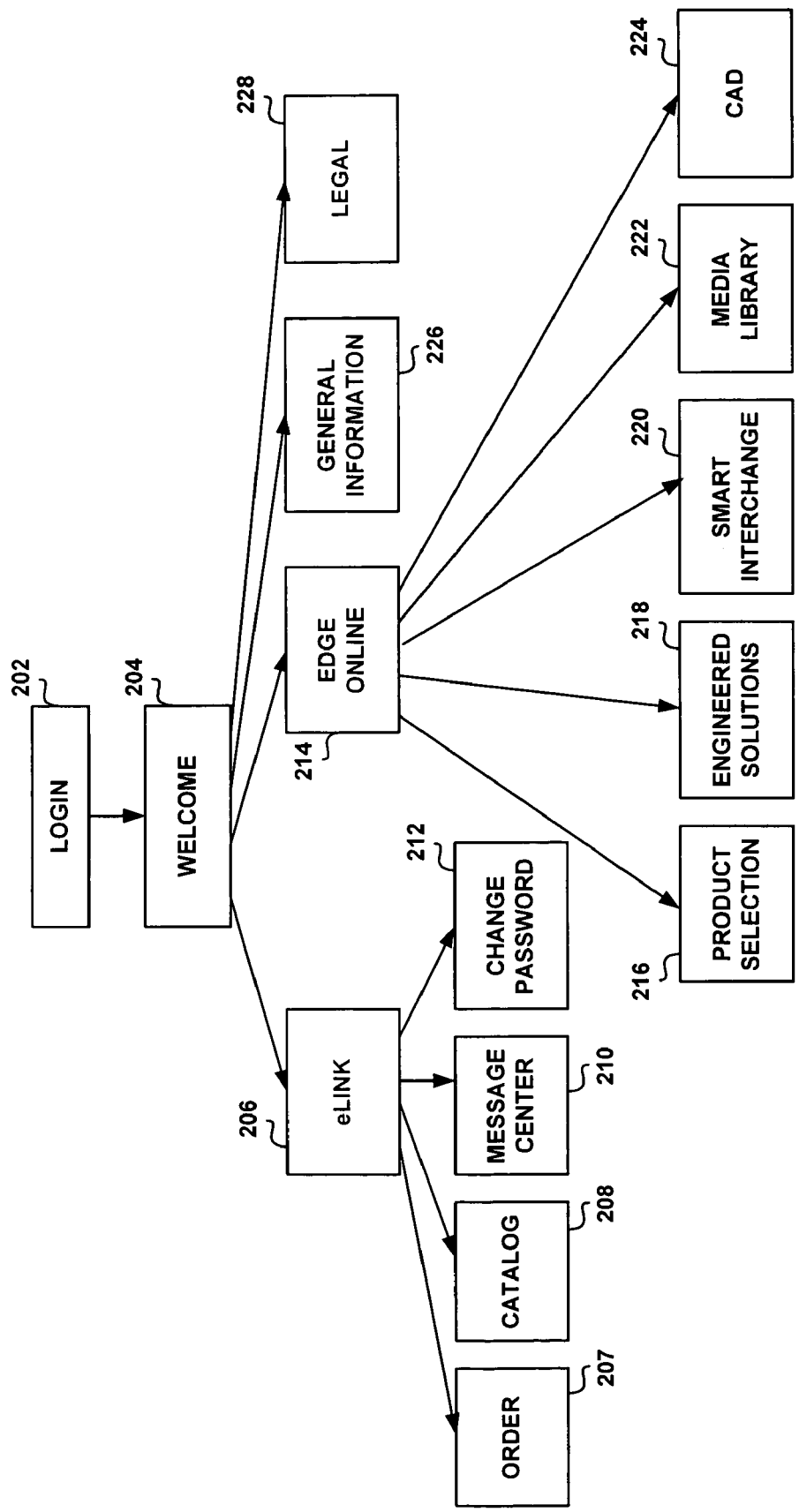

FIGURE 8B

Emerson Power Transmission

Terms & Conditions | Contacts | Site Feedback | Help | Logoff

Mounted Bearing Inputs — 820
Description (for your future reference)

Housing | Loading | Life | Shaft

- Cartrige Unit
- Four-Bolt Flange
- Hanger Unit
- Insert or ER Unit
- Pillow Block
- Piloted Flange
- Take-Up Unit
- Tapped-Base Pillow Block
- Three-Bolt Flange
- Two-Bolt Flage

Basic Engineering Information

- Radial Load: [Required] lbs.  Thrust Load: [0] lbs.
- Speed: [Required] rpm
- Required L10 Life: [10000] hrs.
- Shaft Diamter: [Smallest]
- Housing Type: [Pillow Block]
- Ambient Temp: [72] deg. F
- Reversing Rotation: [No]
- Vertical Shaft: [No]
- Shaft Misalignment: [None]

[Next ->]   [Bearing Options]   (Solutions)

Sidebar:
- eLINK
- EDGE Online:
- Product Selection
- Engineered Solutions
- Smart Interchange
- Media Library
- CAD
- Unmounted Bearings
- Mounted Bearings
- Raider Worm Gear Reducers
- Cobra Worm Gear Reducers
- Shaft Mount Reducers
- General Info
- Legal

FIGURE 8C

Emerson Power Transmission

Terms & Conditions | Contacts | Site Feedback | Help | Logoff eLINK
EDGE Online:
Product Selection
Engineered Solutions
Smart Interchange
Media Library
CAD
  Unmounted Bearings
  Mounted Bearings
  Raider Worm Gear Reducers
  Cobra Worm Gear Reducers
  Shaft Mount Reducers
General Info
Legal

Application Environment
Particle Contamination

Size      [0-None ▼]
Quantity  [0-None ▼]
Moisture  [0-None ▼]
Vibration [0-None ▼]
Shock     [0-None ▼]
Corrosion [0-None ▼]

Environment Presets by Industry/ Application
Agitators - Liquids - Variable Density
Agitators - Liquids & Solids
Agitators - Pure Liquids
Agitators - Semi-Liquids - Variable Density
Brewing & Distilling - Cappers-Conveyors
Brewing & Distilling - Fillers-Conveyors
Brewing & Distilling - Misc Conveyors
Brewing & Distilling - Palletizers
Clay Working Machinery - Brick Presses
Clay Working Machinery - Briqurtte Machines Find and click on your application. Click Apply to use the values displayed. You may adjust the sliders if you feel your application has different conditions. These values are offered as general quidelines only. Please feel free to contact Company A to discuss your specific application.

Contamination:
  Size        0
  Quantity    0
  Moisture    0
  Vibration   0
  Shock       0
  Corrosion   0

[<- Continue]   (Solution)   [Apply]

Emerson Power Transmission

EPT

Terms & Conditions | Contacts | Site Feedback | Help | Logoff

This Solution is based on the use of EPT COMPONENTS. Substitution of competitive product may result in reduced drive life and/or unsatisfactory performance.

Prepared by User A, on 01/03/02 (Solution #62037)

| | Part Number | Size | Type | L10 Life | Locking | Seal | Cost |
|---|---|---|---|---|---|---|---|
| 850 | NP-12T | 3/4 (*) | Ball | L10 > 100,000 | Skwezloc | Felt Washer | 1.420 |
| | MP-16T | 1 (*) | Ball | L10 > 100,000 | Skwezloc | Felt Washer | 2.260 |
| Best | RPB-103-2 | 1-3/16 (*) | Tapered Roller | L10 > 100,000 | Double Setscrew | Felt Washer | 4.210 |
| | RPB-104-2 | 1-1/4 | Tapered Roller | L10 > 100,000 | Double Setscrew | Felt Washer | 4.210 |
| | RPB-103-C2 | 1-3/16 (*) | Tapered Roller | L10 > 100,000 | Double Setscrew | Contact | 4.210 |
| | RPB-104-C2 | 1-1/4 | Tapered Roller | L10 > 100,000 | Double Setscrew | Contact | 4.210 |
| 852 | NP-8 | 1/2 | Ball | L10 > 100,000 | Single Setscrew | Felt Washer | 1.180 |
| | NP-9 | 9/16 | Ball | L10 > 100,000 | Single Setscrew | Felt Washer | 1.520 |
| Better | NP-10 | 5/8 | Ball | L10 > 100,000 | Single Setscrew | Felt Washer | 1.180 |
| | NP-11 | 11/16 | Ball | L10 > 100,000 | Single Setscrew | Felt Washer | 1.520 |
| | NP-12 | 3/4 (*) | Ball | L10 > 100,000 | Single Setscrew | Felt Washer | 1.300 |
| | NP-204 | 20 mm | Ball | L10 > 100,000 | Single Setscrew | Felt Washer | 1.660 |
| | MP-15 | 15/16 | Ball | L10 > 100,000 | Single Setscrew | Felt Washer | 2.300 |
| | MP-16 | 1 (*) | Ball | L10 > 100,000 | Single Setscrew | Felt Washer | 2.060 |
| | MP-305 | 25 mm | Ball | L10 > 100,000 | Single Setscrew | Felt Washer | 2.300 |
| | PB970NEX 1 3/8 | 1-3/8 | Tapered Roller | L10 > 100,000 | Double Setscrew | Contact | 5.550 |
| | PB970NEX 1 7/16 | 1-7/16 (*) | Tapered Roller | L10 > 100,000 | Double Setscrew | Contact | 5.550 |
| 854 | VPS-208 | 1/2 | Ball | 71,192 | Single Setscrew | Contact | 1.000 |
| | VPS-210 | 5/8 (*) | Ball | 71,192 | Single Setscrew | Contact | 1.000 |
| Good | VPLE-208 | 1/2 | Ball | 71,192 | Eccentric | Contact | 1.000 |
| | VPLE-210 | 5/8 (*) | Ball | 71,192 | Eccentric | Contact | 1.000 |
| | PBE920X 1 3/16 | 1-3/16 (*) | Tapered Roller | L10 > 100,000 | Double Setscrew | Contact | 2.980 |
| | PBE920X 1 1/4 | 1-1/4 | Tapered Roller | L10 > 100,000 | Double Setscrew | Contact | 2.980 |

* These sizes have the best availability.

Return to Top

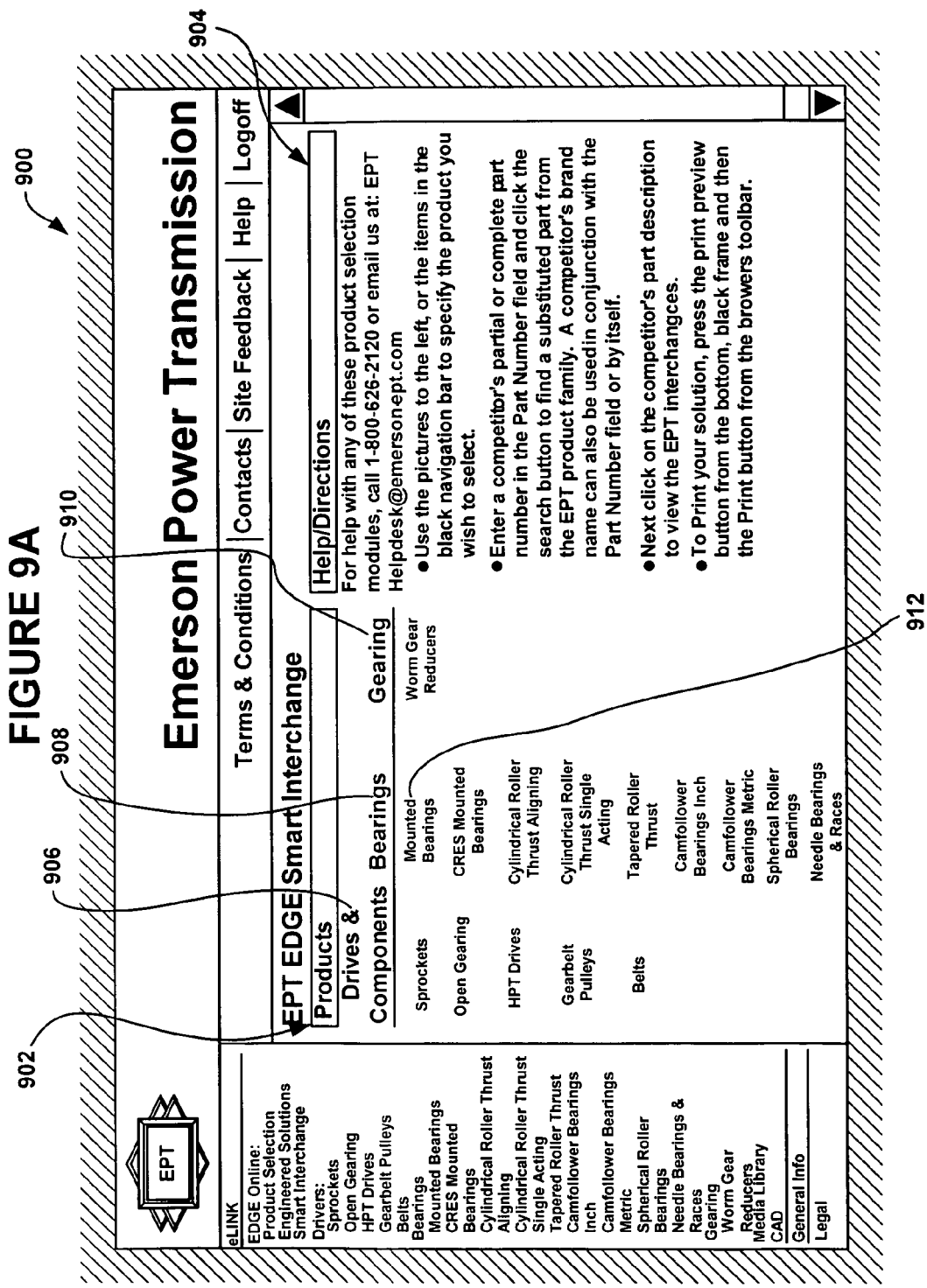

FIGURE 9D

Emerson Power Transmission

Terms & Conditions | Contacts | Site Feedback | Help | Logoff

Back To Part Selection

Product A Part Number 58597
Manufacturer Information based on Catalog DMR-1203-1 and Web PDF File New Search

EPT Smart Interchange Search Results — Please Select the desired part to view interchange information

| Best Interchange |
|---|
| 1  ** CPS 216 |

| Functional Interchange |
|---|
| None found |

CPS 216 Product Interchange

|  | EPT | Company A |
|---|---|---|
| Part # | CPS 216 | 58597 |
| Brand Name | D | A |
| If EPT accessory part numbers are listed, all parts must be ordered for a complete interchange. | | |
| Bore Size | 1 | 1 |
| Housing Type | Pillow Block | Pillow Block |
| Housing Material | Composite | Composite |
| Bearing Type | Ball | Ball |
| Inner Material | Standard | Standard |
| Seal Type | Single Lip Contact w/ Flinger | Single Lip Contact w/ Flinger |
| Locking Type | Set Screws | Set Screws |
| Duty Series | Standard | Standard |
| Application Type | Corrosion Resistant | Corrosion Resistant |

Product Features
- High strength reinforced composite housing with machined base
- Advance Marking System for unit identification without bacteria entrapment points
- H1 USDA/FDA Compliant Food Grade Grease Values in red represent a difference between the parts

CPS 216 Dimension Interchange

Values in red represent a difference between the parts

| Dwg. Label | EPT | Company A | Diff. |
|---|---|---|---|
| Bore Size | I.D. | 1 | 1 | 0 |
| B | B | 5.5 | 5.515625 | -0.016 |
| CMIN | CMIN | 3.75 | 3.984375 | -0.234 |
| E | E | 0.75 | 0.59375 | 0.156 |
| G | G | 0.546875 | 0.59375 | -0.047 |
| J | J | 1.375 | 1.1875 | 0.188 |
| L | L | 1.963125 | NA | NA |
| N | N | 1.476563 | NA | NA |
| WEIGHT | WEIGHT | 0.9796 | 0.7 | 0.28 |

| Dwg. Label | EPT | Company A | Diff. |
|---|---|---|---|
| A | A | 1.4375 | 1.4375 | 0 |
| CMAX | CMAX | 4.5 | 4.28125 | 0.219 |
| D | D | 1.5 | 1.484375 | 0.016 |
| F | F | 0.4375 | na | NA |
| H | H | 2.796875 | 2.875 | -0.078 |
| K | K | 0.5625 | 0.766 | -0.204 |
| M | M | 2.203125 | na | NA |
| BOLT SIZE | BOLT SIZE | 3/8 | 3/8 | Equal |

(Order)

FIGURE 10D

Emerson Power Transmission

Terms & Conditions | Contacts | Site Feedback | Help | Logoff

EPT EDGE CAD
The following Cam Follower Bearings best meet your sear criteria. To download the desired part, click on the Part Number below. Yo select another part or requery the database, click here.

Search for Part Number: CF-1-S

Prepared by User A

| Part Number | Outside Diameter | Stud-Bore Diameter | Length OAW | Description |
|---|---|---|---|---|
| BCCF-1-S | 1 | 0.4375 | 1 | Camfollower, stud type, sealed, crowned O.D., bushing type |
| BCCF-1-SB | 1 | 0.4375 | 1 | Camfollower, stud type, sealed, crowned O.D., bushing type |
| BCF-1-S | 1 | 0.4375 | 1 | Camfollower, stud type, sealed bushing type |
| CCF-1-S | 1 | 0.4375 | 1 | Camfollower, stud type, sealed crowned O.D., needle rollers |
| CCF-S-CB | 1 | 0.4375 | 1 | Camfollower, stud type, sealed crowned O.D., needle rollers |
| CF-1-S | 1 | 0.4375 | 1 | Camfollower, stud type, sealed, needle rollwers |
| CF-1-SB | 1 | 0.4375 | 1 | Camfollower, stud type, sealed, needle rollers | eLINK
EDGE Online:
Product Selection
Engineered Solutions
Smart Interchange
Media Library
CAD
  Unmounted Bearings
  Mounted Bearings
  Raider Worm Gear Reducers
  Cobra Worm Gear Reducers
  Shaft Mount Reducers
General Info
Legal

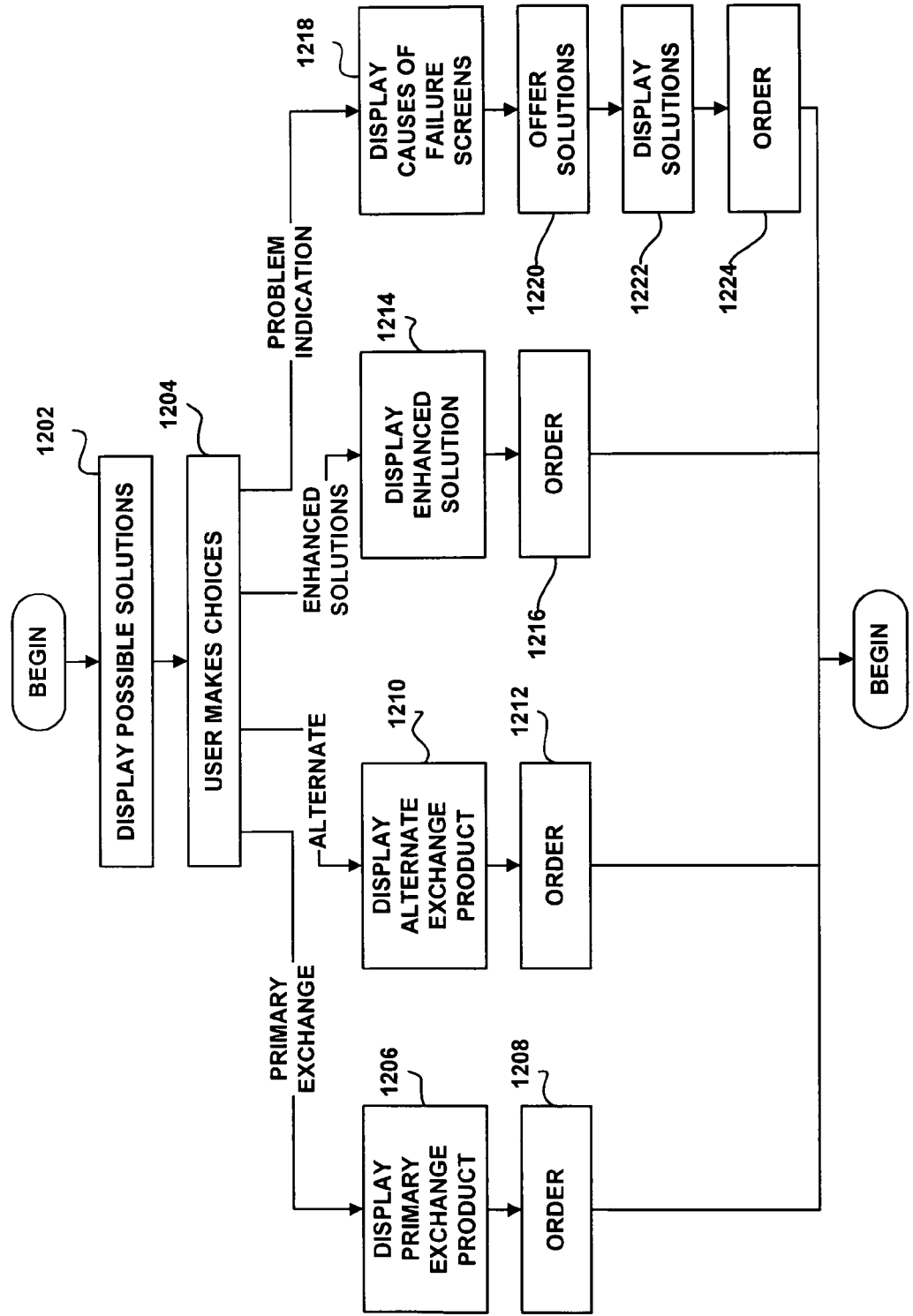

METHOD AND APPARATUS FOR AUTOMATED INFORMATION RETRIEVAL AND COMPONENT ORDERING

FIELD OF THE INVENTION

The present invention relates to systems and methods for automating and facilitating the retrieval and comparison of product information, and the ordering of products. More specifically, it relates to allowing a user to retrieve and compare product information or obtaining a product solution from a list of input parameters, and order products from a website.

BACKGROUND OF THE INVENTION

In many types of businesses, the interface that customers use to obtain and compare product information, and order products is an important concern. Current processes and tools do not support ordering and comparing products at a level of sophistication that is desired by customers. One example of a product line where current systems and methods fall short of achieving desired results is the industrial product field and the power transmission component product line.

Power transmission components are used in many applications. For example, AC and DC motors may be used in industrial manufacturing equipment and processes. Gear couplings may be used to readily transmit mechanical power in applications such as pumps, compressors, air conditioning and refrigeration equipment, fans and blowers, and other rotating machinery. Clutches may be used in the drive trains of printing presses, conveyors, and pumps to prevent damage due to excessive torque generated by overloads and/or jamming.

In other examples of power transmission components, mounted and unmounted bearings may be used in various types of industrial equipment. Belt drives may also be used in various applications.

Previously, customers of power transmission products may have relied upon printed catalogs. The catalogs may include a variety of types of information. For example, the dimensions of a component may be included in the catalog description. In another example, the catalog may include the operating characteristics or tolerances of a power transmission component.

Customers of power transmission products may have also relied on human operators to supply the customer with further information concerning a component. In one example, suppliers of power transmission components may establish a toll-free telephone line that customers may use to obtain further information concerning power transmission components. The human operator may manually communicate information to a customer concerning a power transmission component, for instance, by looking at a catalog and communicating the information to the customer over the telephone. The human operator may also take an order of the customer for a component.

Both of the above-mentioned methods have drawbacks. For example, printed catalogs may be large and cumbersome for the customer to read. In addition, verbal comments from human operators may be unreliable and, in some cases, difficult to obtain during non-business hours.

The Internet has changed business practices around the world making online communications important to strengthening the distribution channels for an organization. This is important to not only a manufacturer, but to the partners of the manufacturer. However, the automated ordering and sophisticated comparison of components is not supported by current systems and processes at a level desired by customers. Accordingly, it is desirable to automate, facilitate, and integrate the ordering and comparison of products and the provisioning of engineered solutions that overcomes the problems associated with prior systems.

SUMMARY OF THE INVENTION

The present invention is directed to systems and methods for automating the retrieval of product information, comparison of product information, and the ordering of products. The system and method of the present invention advantageously allows a user to specify a product from a first manufacturer and obtain a comparable product from a second manufacturer. The system and method of the present invention additionally allows a user to specify parameters for a component and obtain one or more products that have similar or matching parameters. The products may be ranked according to a predetermined set of criteria.

In one aspect of the present invention, a database is coupled to an interchanger subsystem. The database may include information concerning components. The interchanger subsystem may receive product parameters from a selected one of a plurality of users. The product parameters may specify features of a component. The interchanger subsystem may determine a list of interchangeable, substitute components from the information in the database.

In another example of the present invention, a database is coupled to a product selection subsystem. The database may include information concerning components. The product selection subsystem may receive component information from a selected one of the plurality of users and determine a range of product offerings from the information in the database. For instance, a user may input the load and speed of a bearing and obtain solutions.

The foregoing and other features and advantages of the system and method for an automated parts ordering system will be apparent from the following more particular description of preferred embodiments of the system and method as illustrated in the accompanying drawings in which like reference characters refer to the same parts throughout the different views.

BRIEF DESCRIPTION OF THE DRAWINGS

Preferred embodiments of the present inventions are described with reference to the following drawings, wherein:

FIG. 1 is a diagram illustrating a preferred embodiment of the system for automating information retrieval, comparisons, and ordering of components in accordance with the present invention;

FIG. 2 is a flowchart of the general operation of a system for providing information in accordance with a preferred embodiment of the present invention;

FIG. 8b is an illustration of a computer screen display as offered by a particular embodiment of the product selection subsystem 110 in accordance with the present invention;

FIG. 8c is an illustration of a computer screen display as offered by a particular embodiment of the product selection subsystem 110 after the icon 826 of FIG. 8b has been pressed in accordance with the present invention;

FIG. 8d is an illustration of a computer screen display of the as offered by a particular embodiment of the product selection subsystem 110 after the solve icon 821 of FIG. 8b or the solve icon 836 of FIG. 8c have been pressed in accordance with the present invention;

FIG. 9a is an illustration of a computer screen display as offered by a particular embodiment of the interchanger subsystem 106 in accordance with the present invention;

FIG. 9d is an illustration of a computer screen display as offered by a particular embodiment of the interchanger subsystem 106 after field 930 of FIG. 9c has been selected in accordance with the present invention;

FIG. 10d is an illustration of a computer screen display as offered by a particular embodiment of the drawing display subsystem 108 after field 1035 of FIG. 10c has been filed and after icon 1036 of FIG. 10c has been selected in accordance with the present invention;

FIG. 12 is a flowchart of illustrating one example of the operation of an interchanger subsystem in accordance with a preferred embodiment of the present invention;

DETAILED DESCRIPTION OF PREFERRED EMBODIMENTS

Exemplary Architecture and Operation

Figure 3A:
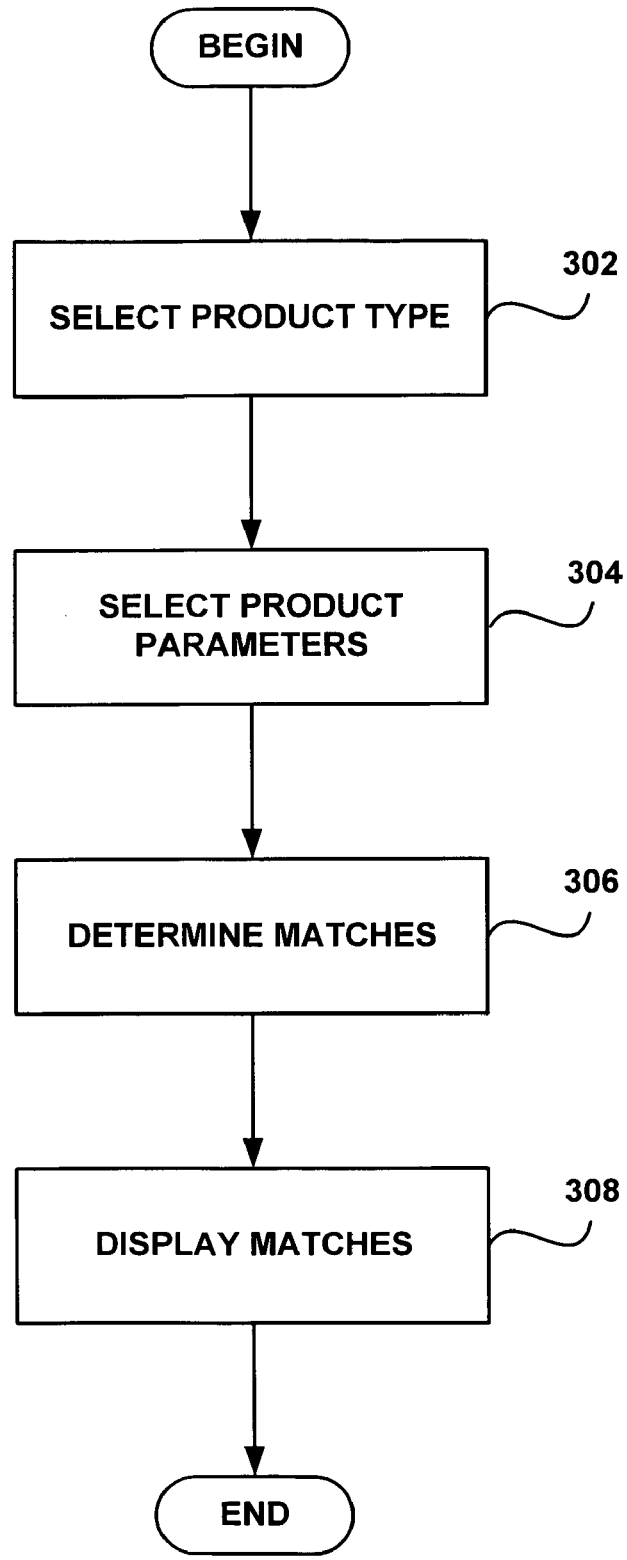
FIG. 3a is a flowchart illustrating one example of the operation of a product selection subsystem in accordance with a preferred embodiment of the present invention.

The present invention is directed to systems and methods for automating information retrieval, comparisons, and ordering of products, for example, power transmission components. Although the description that follows describes the invention in relation to power transmission systems and components, it will be understood that the invention is applicable to any type of component in any type of industry. In other words, the invention is in no way limited to power transmission systems or components.

The operating environment for the methods and apparatus for the system of the present invention includes a processing system with at least one high speed processing unit and a memory system. In accordance with common practices in the art of computer programming, the description below includes reference to acts and symbolic representations of operations or instructions that are performed by the processing system, unless indicated otherwise. Such acts and operations or instructions are sometimes referred to as being "computer-executed" or "processing unit executed."

It will be appreciated that the acts and symbolically represented operations or instructions include the manipulation of electrical signals by the computer-processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals. The memory locations where data bits are maintained are physical locations that have particular electrical, magnetic, optical, or organic properties corresponding to the data bits.

The data bits may be also maintained on a computer readable medium including magnetic disks, optical disks, organic disks, and any other volatile or non-volatile mass storage system readable by the processing unit. The computer readable medium includes cooperating or interconnected computer readable media, which exist exclusively on the processing system or is distributed among multiple interconnected processing systems that may be local or remote to the processing system.

The systems may be implemented using, but not limited to, the software and standards such as, for example, an IDEAS Master Series 7 m2 running on Windows NT, SAP 4.6 running on Windows NT 4.0 (service pack 2), Microsoft Visual C++ (v5.0), and HTML version 3.0. However, it is possible to use other applications, languages, standards, and/or operating systems such as UNIX, LINUX, or others.

Referring now to FIG. 1, one example of a system for automating information retrieval, comparisons, and ordering of components is described. The system includes a management subsystem 102, a catalog subsystem 104, an interchanger subsystem 106, a drawing and display subsystem 108, a product selection subsystem 110, and a general information subsystem 112. The management subsystem 102 is coupled to each of the subsystems 104, 106, 108, 110, and 112. Each of the subsystems may be coupled to a common database 111. In addition, each of the subsystems may include a database, which is internal to the subsystem.

The functions of the management subsystem 102 may be implemented by computer instructions stored in a memory and executed by a processor. The management subsystem 102 may receive instructions from a user, for example, from a human operator at a user interface. The management subsystem 102 may perform any translation function, for example, translating the instructions from one computer-based language to another language. The management subsystem 102 may determine the destination of the instructions and route the instructions to the appropriate subsystem.

The functions of the catalog subsystem 104 may be implemented by computer instructions stored in a memory and executed by a processor. The catalog subsystem 104 may include a database that includes product entries or access product entries from the common database 111. The catalog subsystem 104 may receive instructions to display the catalog entries and, responsively, may display the catalog entries to a user.

The functions of the interchanger subsystem 106 may be implemented by computer instructions stored in a memory and executed by a processor. The interchanger subsystem 106 may receive information including the identity of a product. The interchanger subsystem 106 may take this information and determine (from information stored in the common database 114 or a local database) substitute products that may functionally replace the product. The interchanger subsystem 106 may rank the products using a set of predetermined criteria. The interchanger subsystem 106 may display a list of determined or ranked products. Further, the user may order products from the list.

In one example of the operation of the interchanger subsystem 106, the user enters information concerning a part of a competitor. The user may enter the part number, a competitor's name, or both the part number and the competitor's name. The subsystem 106 may retrieve, from a database, competitor parts that match the information supplied by the user. The subsystem 106 may display a list of competitor part numbers and the user may select one of these parts.

Once the user selects a particular competitor part, the subsystem 106 may perform a database lookup and obtain the dimensions and attributes of that competitor part. The subsystem 106 may next determine substitute parts having dimensions and attributes that match the dimensions and attributes of the competitor part. Alternatively, the subsystem 106 may determine components that most closely match the dimensions and components of the competitor part.

For instance, the subsystem 106 may obtain a list of possible substitute parts from the database and compare the required dimensions (of the competitor part) to the dimensions of a potential substitute part. If a match is obtained, the part is added to a list of substitute parts. If no match exists, another part is obtained from the list of possible substitute parts and the process is repeated. The subsystem 106 may display the list of substitute parts, differences between the competitor part and the substitute part, and/or details of the substitute part to the user as described elsewhere in this specification.

The functions of the drawing and display subsystem 108 may be implemented by computer instructions stored in a memory and executed by a processor. The drawing and display subsystem 108 may receive instructions to download and display the drawings of a particular product for a user. The drawing and display subsystem 108 may locate the drawings, which may be stored in the common database 111, a local database, or a provider's website, and display the drawings to the user.

The functions of the product selection subsystem 110 may be implemented by computer instructions stored in a memory and executed by a processor. The product selection subsystem 110 may receive instructions from a user indicating the parameters of a component. The product selection subsystem 110 may determine a list of products that meet the parameters supplied by the user and may display a list of products to the user. The information used to make the selection may be stored in the common database 111 or a local database. The user may select particular products from the list and the product selection subsystem 110 may display further information concerning these products. Further, the user may order products from the list.

In one example of the operation of the subsystem 110, the user may enter requirements for a mounted bearing. For instance, the user may enter load, speed, and 15,000 hour life requirements.

The subsystem 110 may check to see if the entered information exceeds certain thresholds. The subsystem 110 may then obtain a list of potential solution parts from the database. Associated with each entry for each potential solution part in the database may be parameters of the part.

For each potential solution part, the subsystem 110 may perform a series of calculations. For example, the subsystem 110 may calculate the 15,000 hour lifetime of the potential substitute part (from the values in the database), for instance, using the equation $L10=500*(BDR/(P*(0.03*N)^3))^{10/3}$ where L10 is the 10 year lifetime; BDR is the basic dynamic rating; P is the constant equivalent radial load; and N is the speed. The subsystem 110 may also obtain the bearing rating-to-load (C/P) ratio, bore times speed (DN) value, and the estimated operating temperature of the potential substitute part. The subsystem 110 may compare the values (for the potential substitute part) to the requirements entered by the user. If, at any of the steps, the requirements supplied by the user are not met, a new part is obtained from the list, and the calculations described above are repeated. If a part meets the criteria, it is put on a solutions list. The solutions list may be ranked, for example, into good, better, and best categories as described elsewhere in this specification. This solutions list may be displayed to the user as described elsewhere in this specification.

The functions of the general information subsystem 112 may be implemented by computer instructions stored in a memory and executed by a processor. The general information subsystem 112 may receive instructions from the user indicating that the user desires further information. This information, which may be stored in the common database 111 or a local database, may include general information concerning the website, contact information, or legal notices. Other types of general information may also be displayed.

Referring now to FIG. 2, a flowchart of one example of the general operation of a system for providing component information is described. At step 202, the user logs into the system. The login may be accomplished, for example, by using a conventional login screen requiring a password and user name. At step 204, a welcome screen may be displayed. The welcome screen may indicate to the user that the user has successfully logged into the system and may include sidebars or other icons to allow the user to access additional functions of the system. For example, the user may be given the opportunity to access an eLINK feature, access an EDGE online feature, access general information, or access legal information. Other options are also possible. The eLINK and EDGE online features are described below.

If, at step 204, the user selects the eLINK option, execution continues at step 206. At step 206, the user may be given the option to select a catalog entry, access a message center, order a product, or change their password. Other eLINK options are also possible.

If, at step 206, the user selects the order option, execution continues at step 207. At step 207, the user may order a product or products from an order screen. Products may also be ordered from other subsystems. The ordering may be accomplished via a business subsystem, which may access inventory, accounting, and/or manufacturing subsystems. An example of a business subsystem is the Enterprise Resource Planning (ERP) system, such as a SAP system.

If, at step 206, the user selects the catalog entry option, execution continues at step 208. At step 208, the user may select entries from a catalog and the system may display the entries. The entries may be designated by any type of method. For example, the entries may be designated by a part number or product name. The entries may be designated in full or in part. For example, the user may use wildcard characters to display entries where only a portion of the part number is known. Further, the user may order products from the list.

If, at step 206, the user selects the message center option, execution continues at step 210. At step 210, the system may display messages sent by the system operator to the user. The user may read these messages. The system may also allow the user to send messages to the system operator or other users. Other options are also possible.

If, at step 206, the user selects the change the password option, execution continues at step 212. At step 212, the user may change their password. For example, the user may be provided with a screen to enter a new password and verify the new password.

If, at step 204, the user selects the EDGE online option, execution continues at step 214. At step 214, the system may give the user the EDGE online options of product selection, engineered solutions, smart interchange, media library, and CAD drawings.

If, at step 214, the user chooses the product selection option, execution continues at step 216. At step 216, the user enters a product line and parameters for a particular type of product in that product line. The system determines a list of products from the parameters that fit within the parameters. The system may rank the products on the list using a set of criteria. For example, the products may be ranked as to how close the parameters or the cost of the product. Other examples are possible. Further, the user may order products from the list.

If, at step 214, the user chooses the engineered solutions option, execution continues at step 218. At step 218, the system may provide a form to allow the user to specify various types of parameters. The form may be sent to the system operator and the system operator may contact the user to provide a custom solution for the user at a later time.

If, at step 214, the user chooses the smart interchange option, execution continues at step 220. At step 220, the user may supply product identification information. The system may then determine a list of substitute products that may functionally replace the product specified by the user. The system may perform a ranking of these components or arrange the components in any number of ways for display to the user. Further, the user may order products from the list.

If, at step 214, the user chooses the media library option, execution continues at step 222. At step 222, the user may select different on-line publications for display. Alternatively, the user may be given the choice to order publications for delivery to the home or business of the user.

If, at step 214, the user chooses the CAD option, execution continues at step 224. At step 224, the user may select CAD drawings for display. For example, the user may specify a product in any way and the system may display a CAD drawing of the product. The CAD drawing may be downloaded from a database to the user.

If, at step 204, the user selects the general information option, execution continues at step 226. At step 226, the system may display general information for the user, for instance, information about the website or contact information.

If, at step 204, the user selects the legal option, execution continues at step 228. At step 228, the system may display legal notices for the user.

Referring now to FIG. 3a, one example of the operation of a product selection subsystem is described. At step 302, a user selects a product type. The user may be presented with a screen that gives a number of different products types from which the user may choose. In one example, the user may choose between types of drives, bearings, and gearing products.

At step 304, the user selects product parameters. The user may be presented with a screen where the user may enter different types of parameters. In one example, if the user has chosen mounted bearings as the product, the user may enter the radial load, speed, required life, shaft diameter, and other characteristics of the desired mounted bearing. The user may be required to enter some or all of these characteristics before moving to the next step.

At step 306, the system determines any matches that exist for the product. The system may also rank the matches using a set of predetermined criteria. For example, the system may determine good, better, and best matches. From these matches a list may be created.

At step 308, the system displays the matches to the user. Different modules for different products may perform the engineering calculations needed to size a component. The user may supply parameters such as load, speed, speed reduction, centerline, and desired life. The system may display a screen to the user ordered according to the ranking.

Figure 3B:
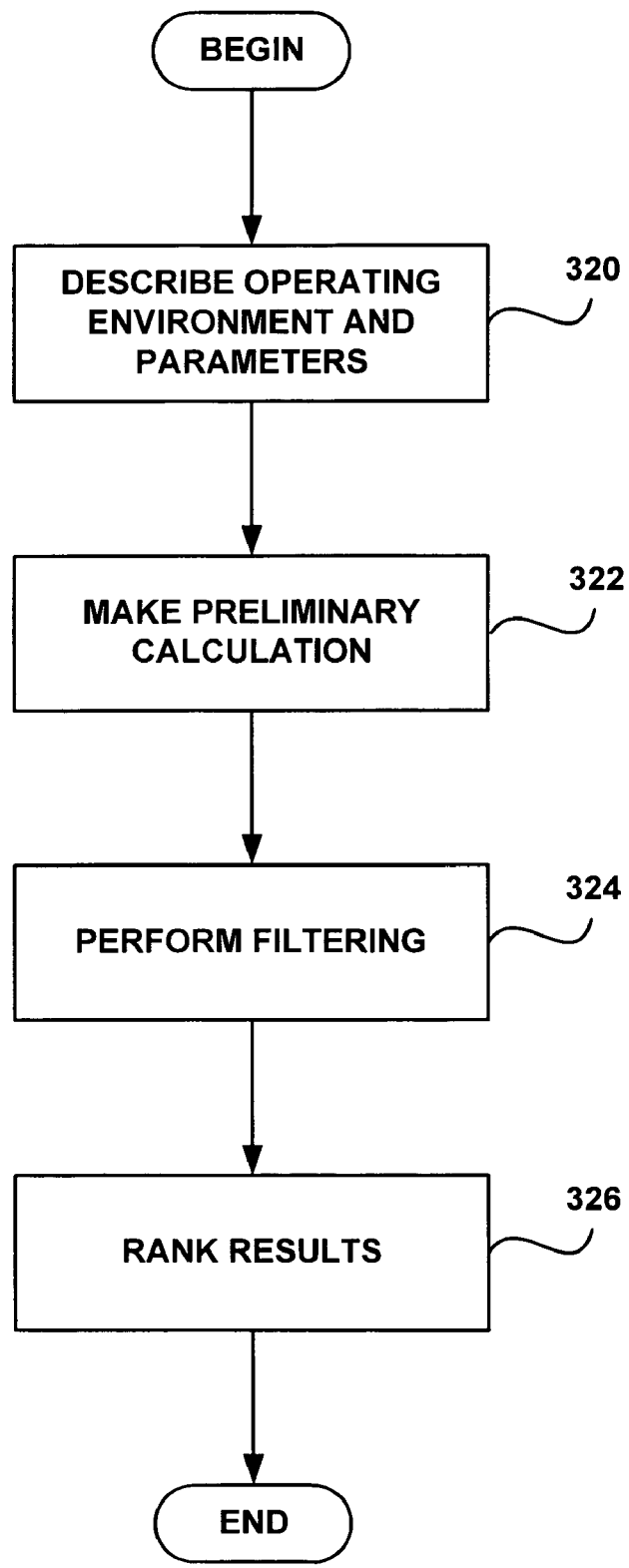
FIG. 3b is a flowchart illustrating one example of the operation of a product selection subsystem showing the mounted bearing selection process in accordance with a preferred embodiment of the present invention.

Referring now to FIG. 3*b*, one example of the operation of a product selection subsystem showing the mounted bearing selection process in accordance with a preferred embodiment of the present invention is described. At step 320, the user describes the operating environment and parameters of the bearing. For example, the user may supply parameters such as load, speed, shaft diameter, and desired life.

At step 322, a preliminary calculation is made to find bearings that will attain the minimum desired life the user has specified. This step results in a preliminary list of components.

At step 324, a filtering is made. The system may take the factors supplied by the user to arrive at a short list of recommendations. For example, the system may compare speed to bearing type and locking device; estimate operating temperature; compare contamination to seal design; and compare ambient and predicted temperatures. The comparisons may determine a list of products that may conform to the product desired by the user.

At step 326, the filtered list is ranked in terms of being good, better, and best. In one example, the good products will fulfill the minimum requirements of the application of the user. The better and best components may enhance the performance of the bearing in the application. The system may also tag or otherwise identify products that are more readily available for shipment when the list is displayed to the user.

Figure 4:
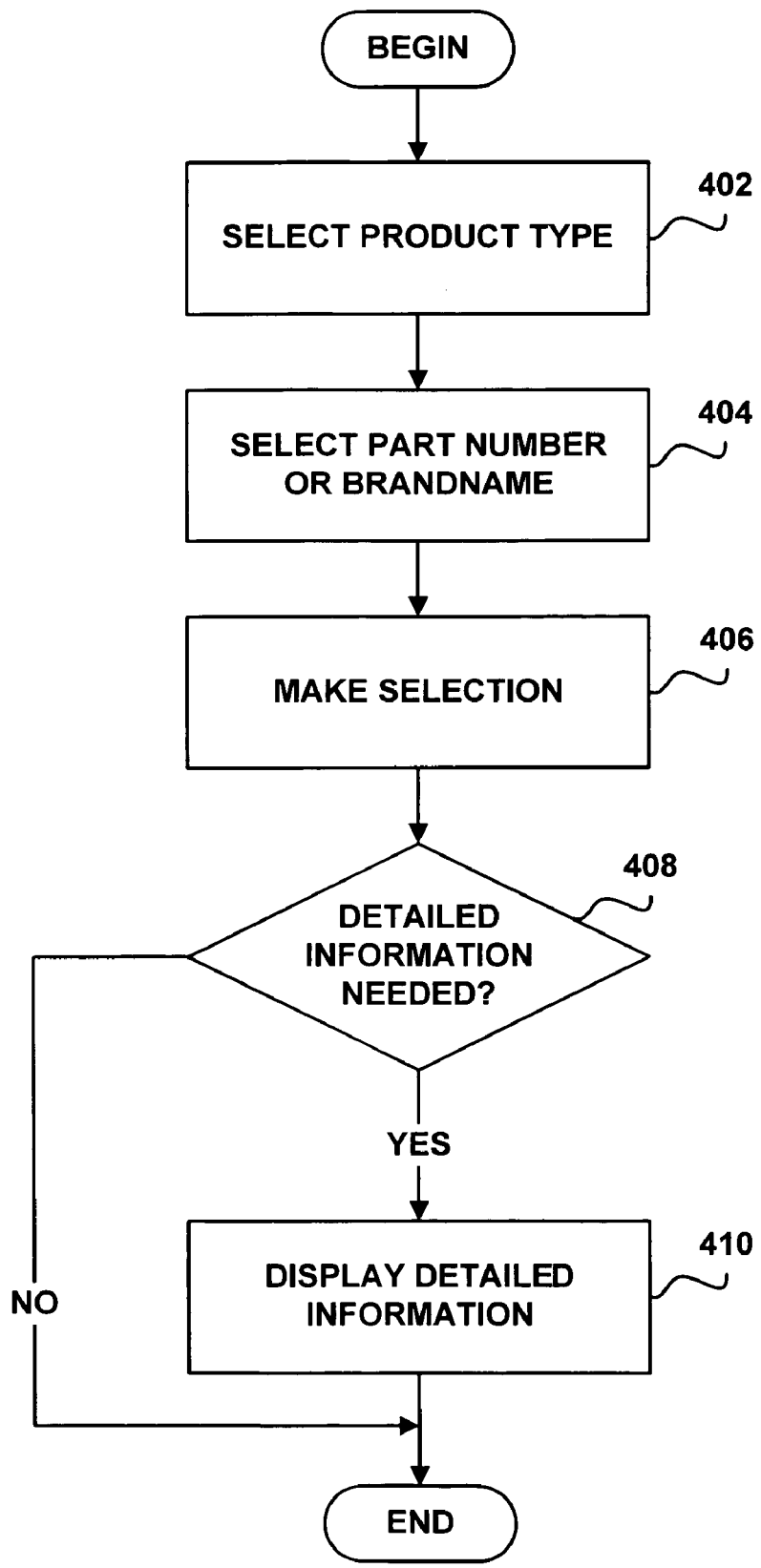
FIG. 4 shows a flowchart illustrating one example of the operation of an interchanger subsystem in accordance with a preferred embodiment of the present invention.

Referring now to FIG. 4, one example of the operation of an interchanger subsystem is described. At step 402, the user selects a product type. The user may be presented with a screen that gives a number of different products types from which the user may choose. In one example, the user may choose between types of drives, bearings, and gearing products.

At step 404, the user selects a part number or brand name. The user may be presented with a screen whereby the user can specify this information.

At step 406, the system determines substitute products that may replace the product specified by the user. A comparison is done of the alphanumeric characters entered by the user. The comparison may ignore spaces, dashes, and other characters to allow for variations in the input of a user. A database lookup is performed and a result screen displayed.

If the product specified by the user is not found, then a message to that effect is returned to the user. If the product is found in the database, but a substitute product not found, the user may be prompted to contact a Technical Services representative. If the product and substitute product or products are found, the system may display a list of substitute products. The substitute product name or number may be an icon, which the user can "click" to receive information concerning the substitute product. The products may be categorized as "best" and "functional" interchanges, in one example. "Best" products may represent products with other desirable characters as compared to "functional" products, in this example.

In another example, the system may display products that constitute primary exchanges, alternate exchanges, and enhanced solutions. The enhanced solution may be a product with additional or more desirable features than the features indicated by the user. The user may also request additional information, for instance, by indicating they are having special problems. This option is described in more detail in relation to FIG. 12, below.

At step 408, the user determines whether additional information is needed. If the answer is affirmative, then execution continues at step 410. If the answer is negative, execution ends.

At step 410, the user may click on the icon and detailed interchange information may be displayed for a substitute product. For example, the system may display dimensions, material composition, and possible applications for the substitute product. Further, the user may order product.

Figure 5:
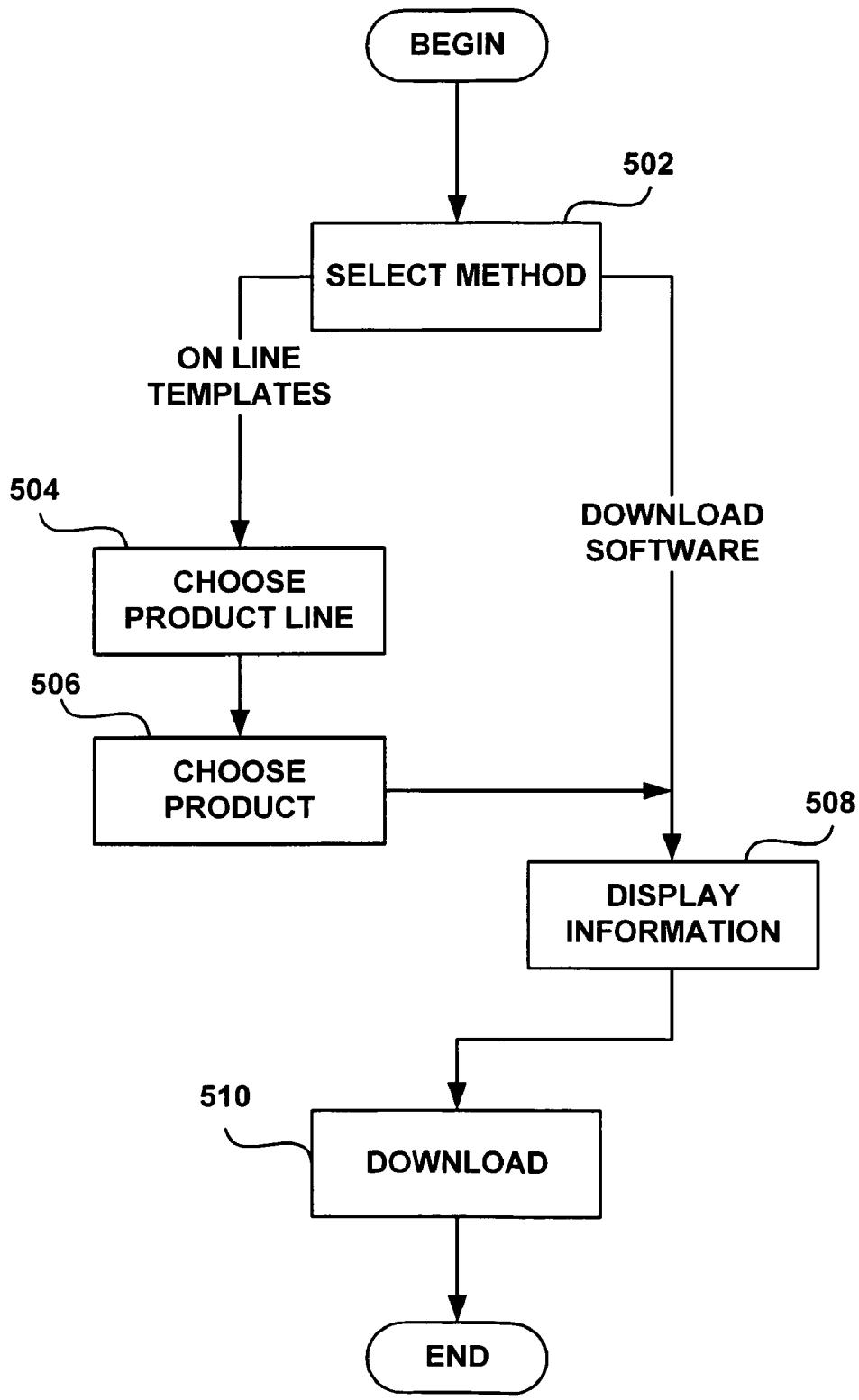
FIG. 5 shows a flowchart illustrating one example of the operation of a drawing display subsystem in accordance with a preferred embodiment of the present invention.

Referring now to FIG. 5, one example of the operation of a drawing and display subsystem is described. At step 502, the user selects a method to display the drawings. In this example, the two options are on-line templates and download software. If the user chooses the online template option, control continues at step 504. If the user chooses the download software option, control continues at step 508.

At step 504, the user chooses a product line. For example, the system may display a list of product options and the user may select the product line by clicking on the name.

At step 506, the user may choose a particular product from the product line. Another screen or screens may be presented to the user to allow the user to input a particular part number or attributes of the part.

At step 508, a list of products is displayed. For example, the ZIP may be displayed. In another example, the system may display a product list, the user may select a product, and the system may display the CAD file of the selected product.

At step 510, software is downloaded to the user. The software may include the CAD files of a particular product. In one example, ZIP files are downloaded. The user may choose the files to be downloaded from a menu.

Figure 6:
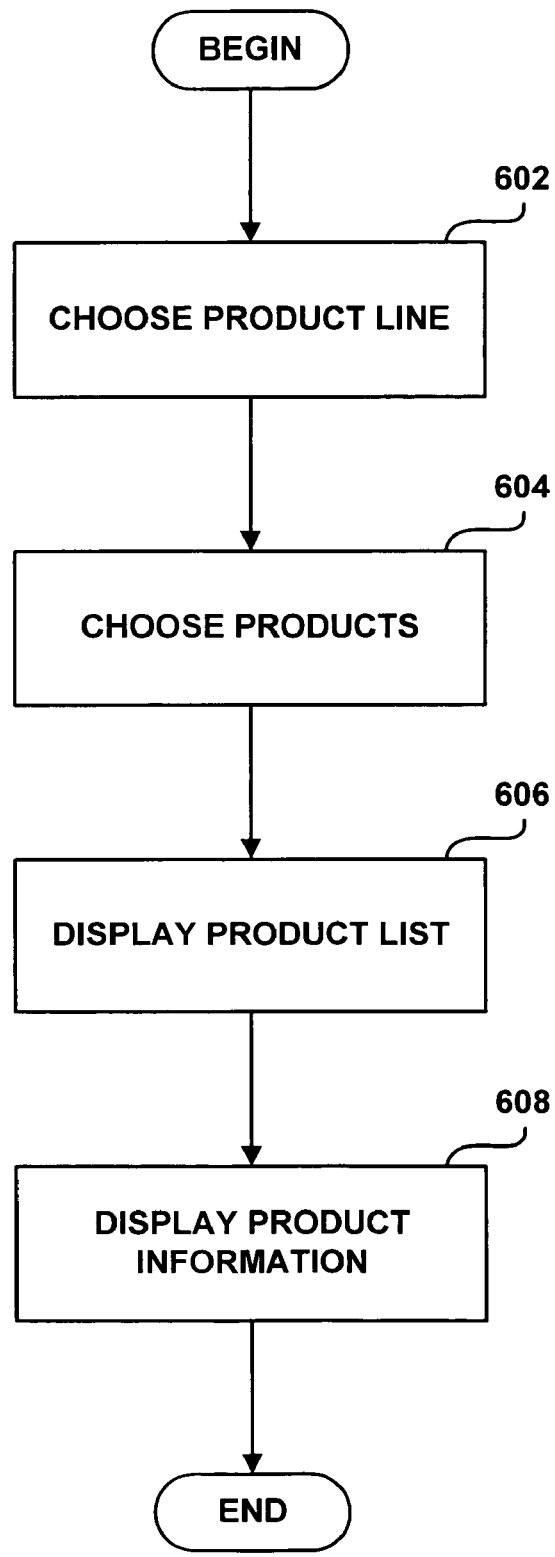
FIG. 6 shows a flowchart illustrating one example of the operation of a catalog subsystem in accordance with a preferred embodiment of the present invention.

Referring now to FIG. 6, one example of the operation of a catalog subsystem is described. At step 602, the user chooses a product line. The user may be presented with a product line and the user may click on the product line.

At step 604, the user may choose a particular product. For example, the user may be given a search screen where the user enters parameters for the product. The user may initiate the search by pressing, for instance, a search icon. The system then searches the database for products that match the request.

At step 606, the system displays a list of products that match the request. The user may select, for example, by clicking on the product, additional information for the product. At step 608, the system displays the product information. The display may include a printout of the catalog page with relevant information about the part.

Referring now to FIG. 12, one example of the operation of an interchanger subsystem is described.

At step 1202, the system displays a list of possible product solutions available to the user. For example, the system may offer primary exchange products, alternate exchange products, enhanced solution products, and problem indications. Primary solution products may, in one example, be substitute products that meet the minimum needs of the user.

Alternate exchange products may be other substitute products that meet the minimum needs of the user, but may be not as good of a solution product as the primary solution product. For example, alternate exchange products may be products that are not as readily available to the user. Enhanced solution products may be substitute products that include additional features or have enhanced performance that may be of interest to the user. Problem indications may represent an icon or hyperlink that asks whether the user is having problems with a product. Each of the above product solutions (including each of the substitute products) may be in the form of an icon or hyperlink.

At step 1204, the user makes a choice of the possible solution product. For example, the user may select the icon or hyperlink representing particular primary interchange products, alternate interchange products, enhanced solution products, or problem indications.

If, at step 1204, the user indicates a primary interchange product, execution continues at step 1206. At step 1206, the system displays primary exchange product information. For example, the system may display screens indicating product dimensions for the primary interchange product. At step 1208, the user may select a particular product and order that product, for example, from an ordering screen.

If, at step 1204, the user indicates an alternate interchange product, execution continues at step 1210. At step 1210, the system displays alternate interchange product information. For example, the system may display screens indicating product dimensions for the alternate interchange products. At step 1212, the user may select a particular product and order that product, for example, from an ordering screen.

If, at step 1204, the user indicates an enhanced solutions interchange product, execution continues at step 1214. At step 1214, the system displays enhanced solutions product information. For example, the system may display screens indicating product dimensions and other features or advantages of the enhanced solutions interchange product. At step 1216, the user may select a particular product and order that product, for example, from an ordering screen.

If, at step 1204, the user indicates a problem indication, execution continues at step 1218. At step 1218, the system displays causes of failures screens. For example, the screens may indicate causes of failures and other information relating to reasons for failure. The user may select these reasons for further information and for products that may address these failure causes. At step 1220, the system offers possible solutions to the user. At step 1222, the user may display the solutions, for example, by pressing an icon or a hyperlink. At step 1224, the user may select a particular product and order that product, for example, from an ordering screen.

Exemplary Computer Screens

FIGS. 7, 8*a-d*, 9*a-d*, 10*a-d*, 11*a-g*, and 13*a-e* are examples of computers screens showing examples of different aspects of the present invention. It will be understood that these are examples only. That is, the content and format of the screens may be modified or adjusted in any number of ways. Specifically, different product lines may have different choices and offer different screens. In addition, products other than power transmission system products may be substituted for the products shown on these screens.

Figure 7:
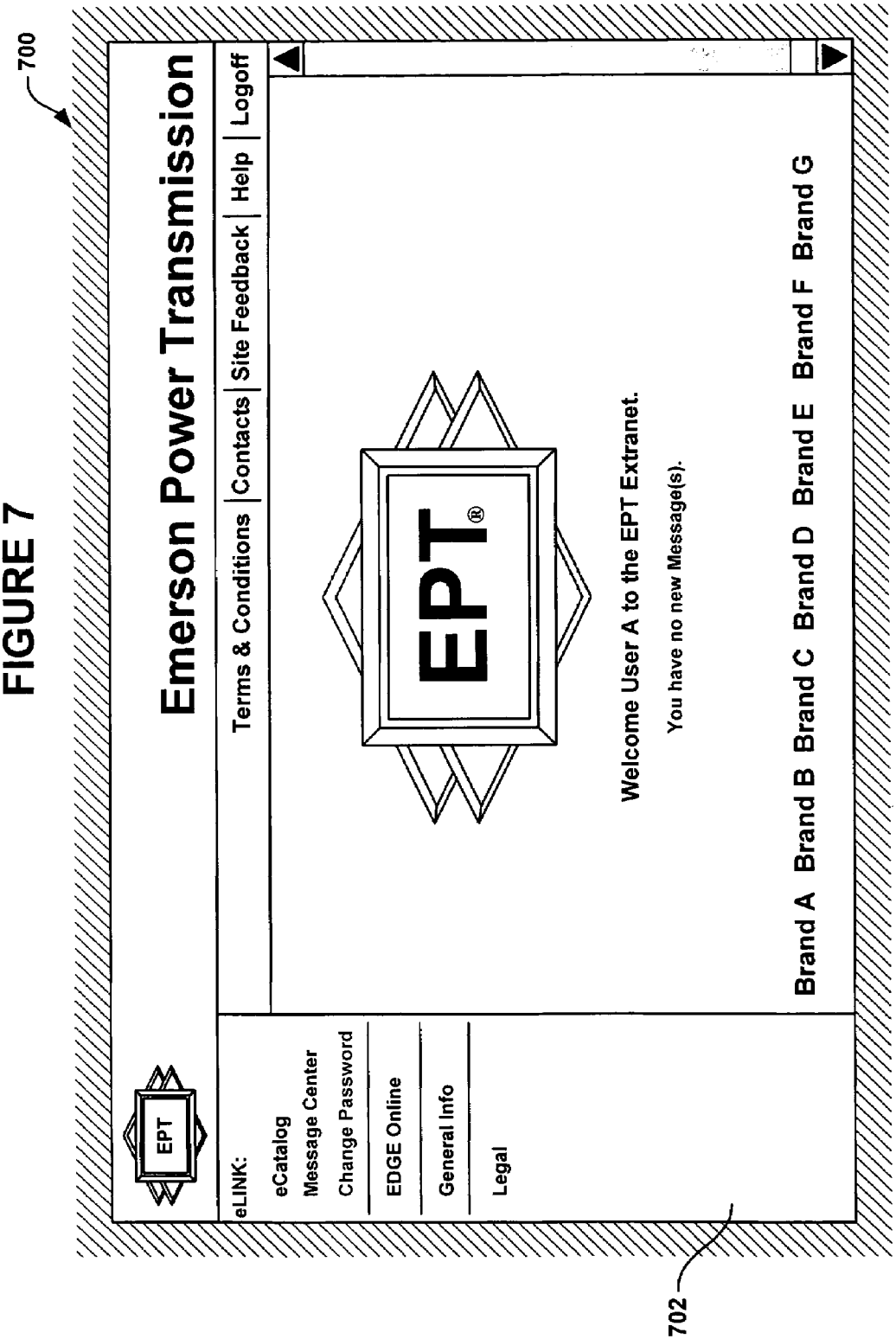
FIG. 7 shows one example of a welcome screen in accordance with a preferred embodiment of the present invention.

Referring now to FIG. 7, one example of a welcome screen 700 is illustrated as offered by a particular embodiment of the management subsystem 102. The welcome screen 700 may be displayed after the user successfully logs on to the system in accordance with the present invention. The welcome screen 700 includes a sidebar 702. The sidebar includes icons that the user may use to navigate to other portions of a web site. For example, the sidebar 702, includes eLINK, EDGE online, general information, and legal hyperlinks. Clicking on a hyperlink may allow the user to choose amongst sub-options. For example, clicking on the eLINK option, may activate a pull-down menu with eCatalog, Message Center, and Change Password sub-options.

Figure 8A:
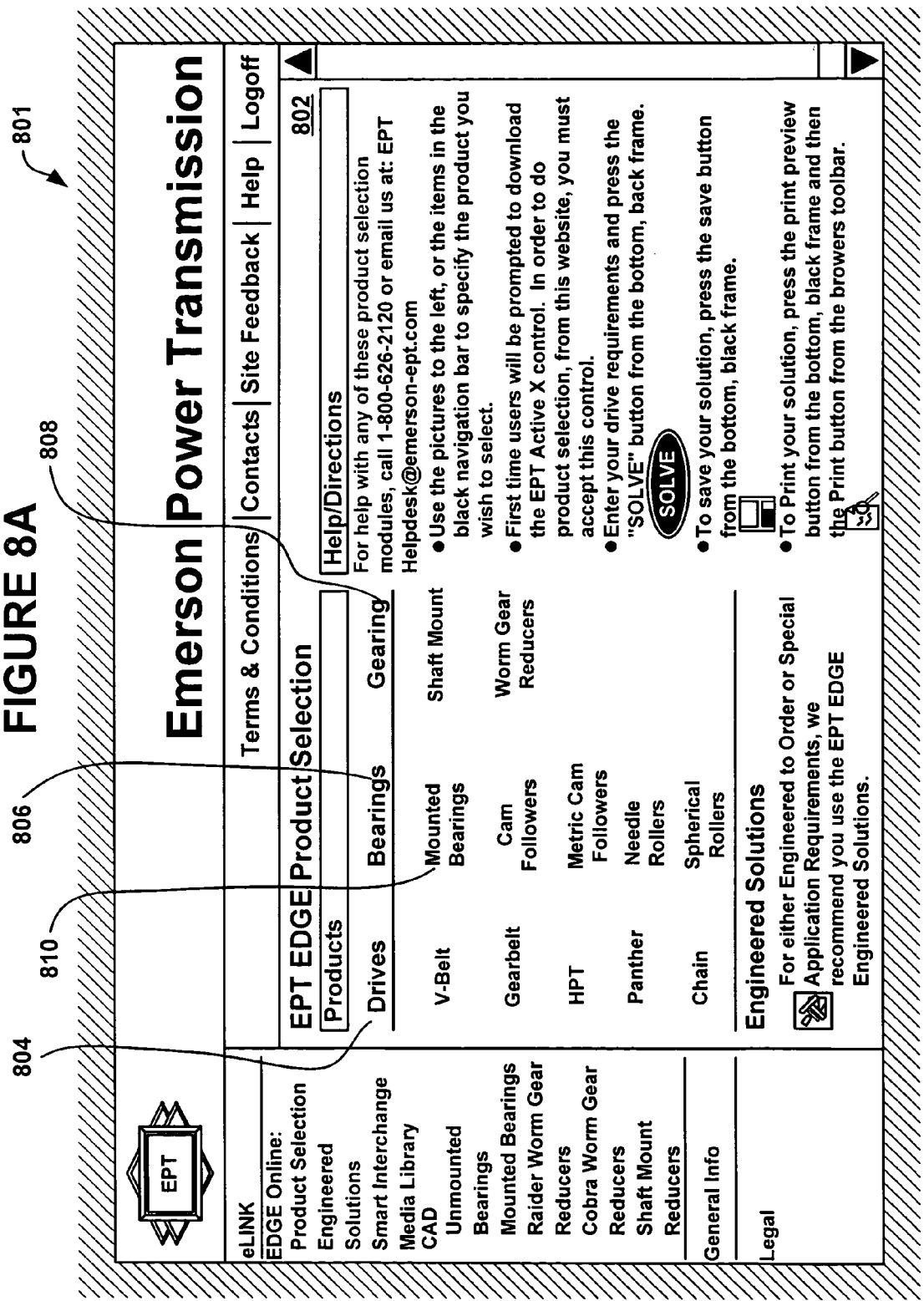
FIG. 8a is an illustration of a computer screen display as offered by a particular embodiment of the product selection subsystem 110 in accordance with the present invention.

FIG. 8*a* is an illustration of a computer screen display 801 as offered by a particular embodiment of the product selection subsystem 110 in accordance with the present invention. The computer screen 801 includes a product selection field 802. The product selection field 802 includes a drive column field 804, a bearings column field 806, and a gearing column field 808. Within each of the columns 804, 806, and 808 are icons representing product lines. For example, an icon 810 represents the mounted bearings product line.

FIG. 8*b* is an illustration of a computer screen display 819 as offered by a particular embodiment of the product selection subsystem 110 in accordance with the present invention after the icon 810 of FIG. 8*a* has been pressed. The computer screen 819 includes a user input section 820. The user input section 820 may include a basic engineering section 828. The computer screen 819 also includes a further information section 822.

The further information section 822 may allow for the further display of information relating to tabs 824. Tabs 824, when pressed by the user, may allow the system to display further information about the product. In this example, the tabs allow for the further display of information related to the housing, load, life, and shaft of the mounted bearing. A next icon 826 is pressed to allow the user to move to the next screen (see FIG. 8*c*).

A bearing options icon 829 allows a user to enter further information. For example, selecting the icon 820 displays a screen where the user can enter the bearing type, the product series, the locking type, the seal type, and whether expansion is desired. After entering the characteristics, the user returns to the screen of FIG. 8*b*. Entering the additional characteristics allows a faster search. A solutions icon 821 may be used to determine a list of products that meet the parameters input by the user.

FIG. 8*c* is an illustration of a computer screen display 831 as offered by a particular embodiment of the product selection subsystem 110 after the next icon 826 of FIG. 8*b* has been pressed in accordance with the present invention. The computer screen 831 includes a user input field 830. In this example, the user input field includes sub-fields where the user can enter particle contamination parameters. A continue icon 834 allows the user to return to the screen of FIG. 8*b*. A further information field 832 allows the user to obtain further information about requested parameters of the user input field 830. A solutions icon 836 may be used to determine a list of products that the meet the parameters input by the user.

FIG. 8*d* is an illustration of a computer screen display 849 as offered by a particular embodiment of the product selection subsystem 110 after the solution icon 821 of FIG. 8*b* or solution icon 836 of FIG. 8*c* have been pressed in accordance with the present invention. The computer screen 849 includes a list of components that fit the criteria supplied by the user. The computer screen 849 shows that the solutions have been ranked. For example, the rankings include a best solutions field 850, a better solutions field 852, and a good solutions field 854. Each of the fields 850, 852, and 854 show a list of parts with descriptive values.

In addition, the parts may be ordered from the computer screen 849. For example, high-lighting a part number a clicking on the part number may cause an order screen to appear. The order screen may filled in by the user and e-mailed to a parts supplier to place the part on order.

FIG. 9a is an illustration of a computer screen display 900 as offered by a particular embodiment of the interchanger subsystem 106 in accordance with the present invention. The computer screen 900 includes a products column 902 and a help column 904. The products column 902 includes a drives & components column 906, a bearings column 908, and a gearing column 910. Each of the columns 906, 908, and 910 include icons representing various product lines. For example, an icon 912 represents the mounted bearing product line.

Figure 9B:
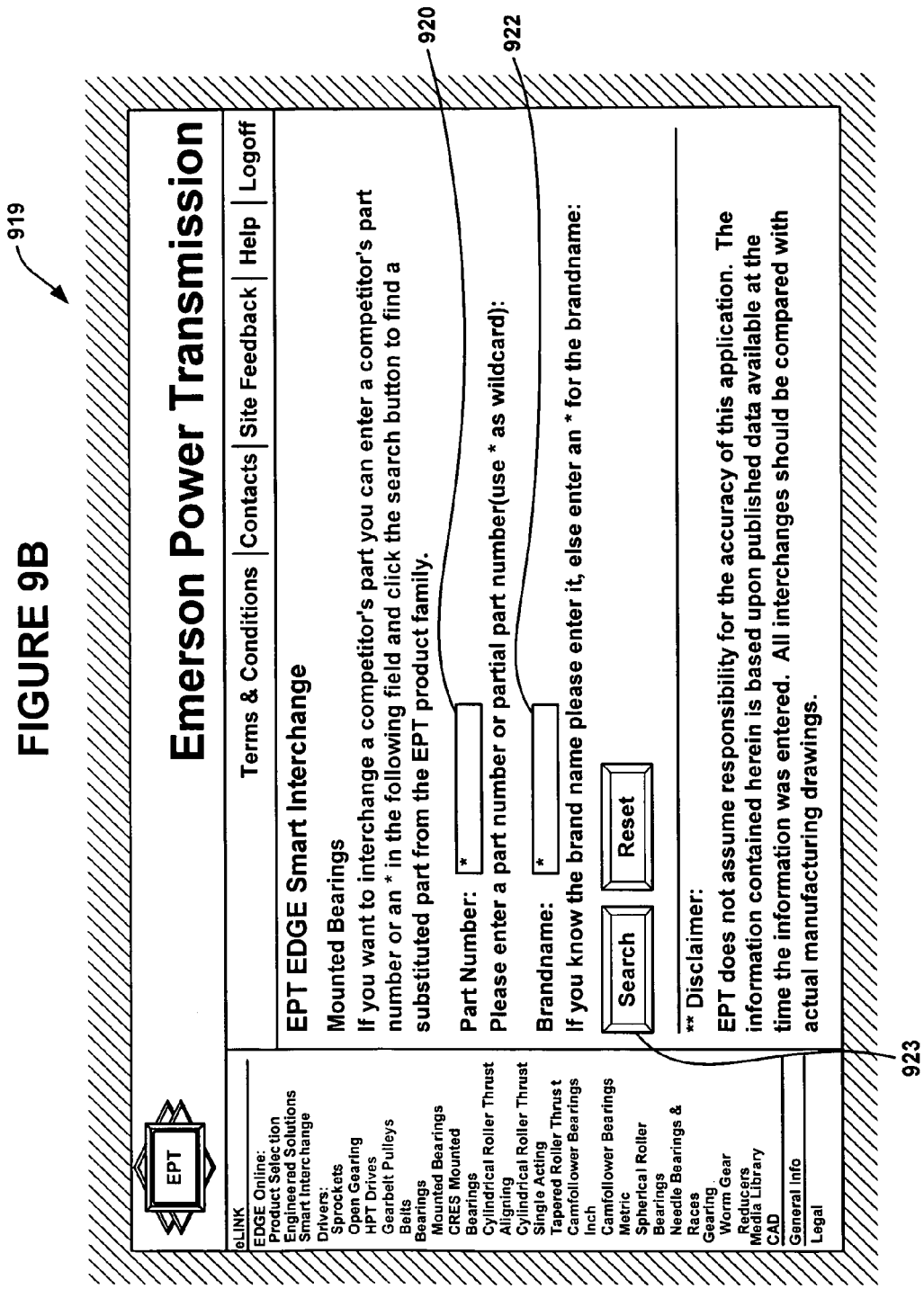
FIG. 9b is an illustration of a computer screen display as offered by a particular embodiment of the interchanger subsystem 106 after icon 912 of FIG. 9a has been selected in accordance with the present invention.

FIG. 9b is an illustration of a computer screen display 919 as offered by a particular embodiment of the interchanger subsystem 106 after icon 912 of FIG. 9a has been selected in accordance with the present invention. The computer screen 919 includes a part number field 920, where the user can enter a part number. Wildcard characters may also be used when only a portion of a part number is known. Alternatively, a brand name field 922 may be used to locate a particular brand name. A search icon 923 may be used to locate a substitute product once either the part number field 920 and/or brand name field 922 have been filled by the user.

Figure 9C:
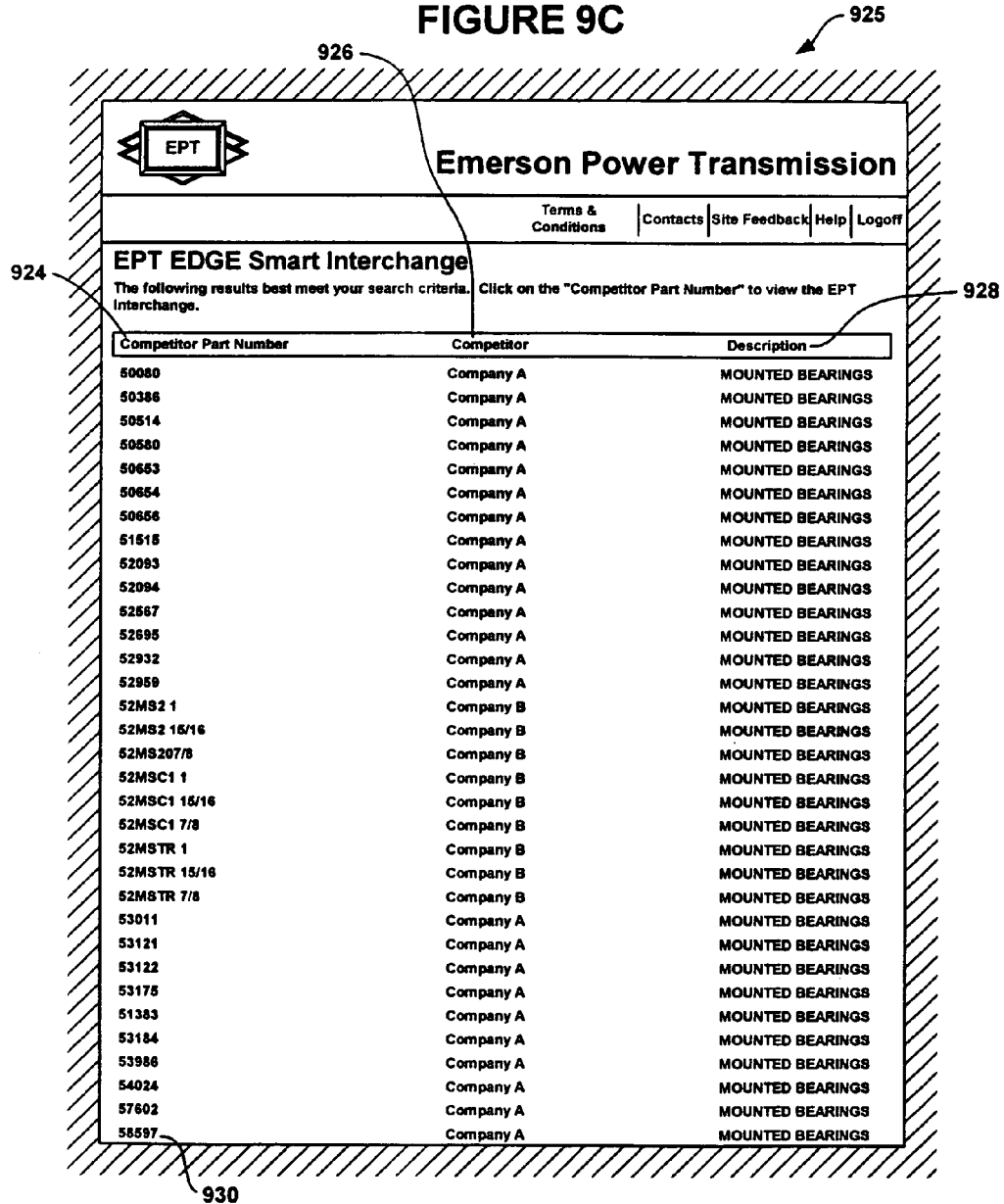
FIG. 9c is an illustration of a computer screen display as offered by a particular embodiment of the interchanger subsystem 106 after field 920 of FIG. 9b has been filled and icon 923 has been pressed in accordance with the present invention.

FIG. 9c is an illustration of a computer screen display 925 as offered by a particular embodiment of the interchanger subsystem 106 after field 920 of FIG. 9b has been filled and search icon 923 has been pressed in accordance with the present invention. The computer screen 925 includes a competitor part number column 924, a competitor name column 926, and a product description column 928. To access further information, a user may click on the icon representing the product number. For example, an icon 930 represents the 58597 product.

FIG. 9d is an illustration of a computer screen display 949 as offered by a particular embodiment of the interchanger subsystem 106 after field 930 of FIG. 9c has been selected in accordance with the present invention. The computer screen 949 includes a smart interchange part field 950, which represents the best interchange, and a functional interchange field 951, which represents a functional interchange. Both of these determinations are made according to predetermined criteria including, for example, cost, availability, and additional features.

The computer screen 949 also includes a product interchange table 952 comparing the substitute product with the product to be interchanged. A product features table 954 includes features of the substitute product. A dimension interchange table 956 compares features of the substitute product to that of the product to be interchanged. An order icon 958 may be pressed that causes an order to be placed for the order with a product supplier. In one example, pressing the order icon 958 causes an order screen to appear. The order screen may filled in by the user to place the part on order.

Figure 10A:
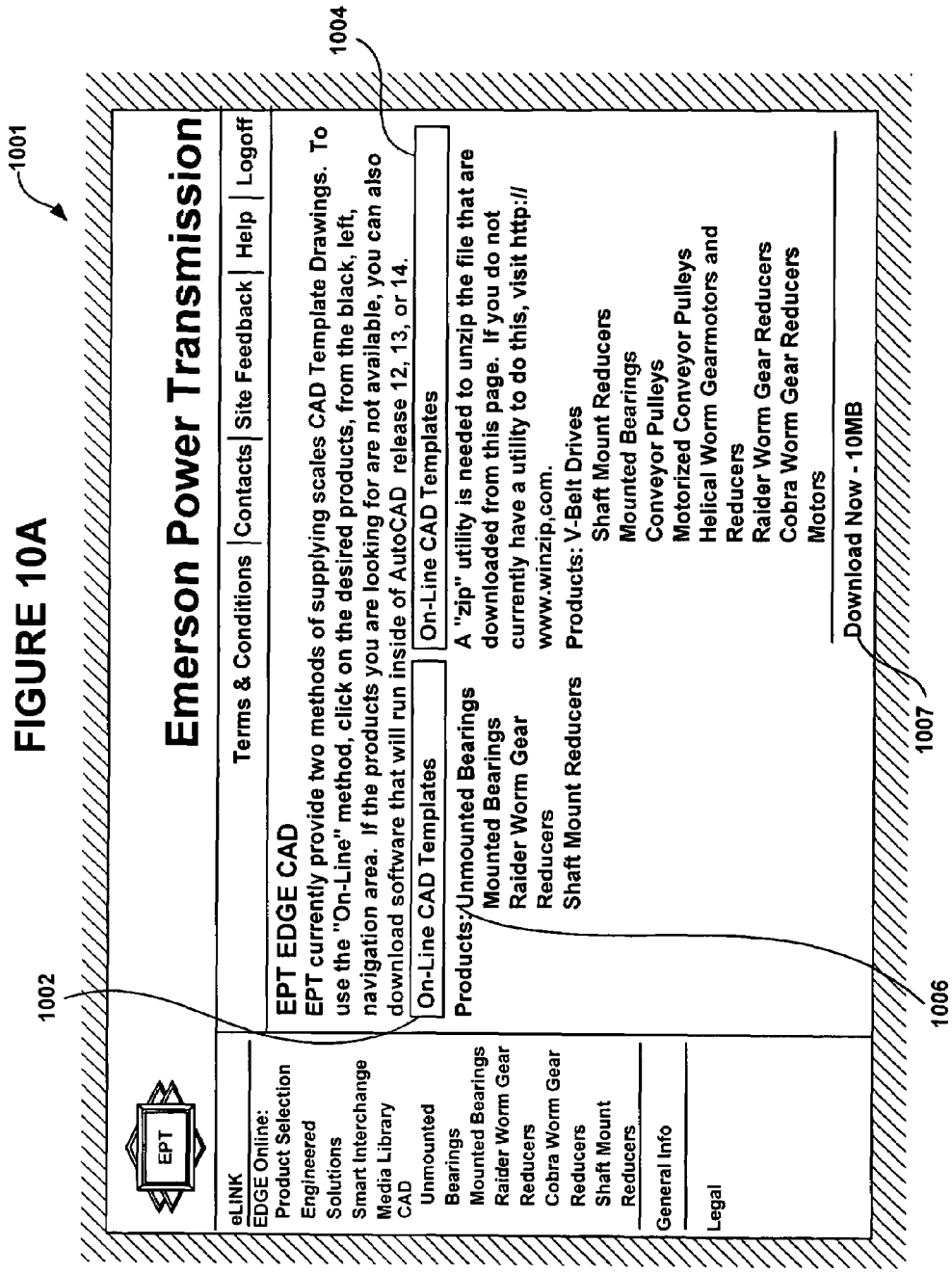
FIG. 10a is an illustration of a computer screen display as offered by a particular embodiment of the drawing display subsystem 108 in accordance with the present invention.

FIG. 10a is an illustration of a computer screen display 1001 as offered by a particular embodiment of the drawing and display subsystem 108 in accordance with the present invention. The computer screen 1001 includes a CAD on-line template column 1002 and a download software column 1004. The CAD on-line template column 1002 includes a plurality of products. Each product name may be an icon, selectable by the user. For example, an icon 1006 represents unmounted bearings. The column 1004 includes instructions to download software and a download icon 1007.

Figure 10B:
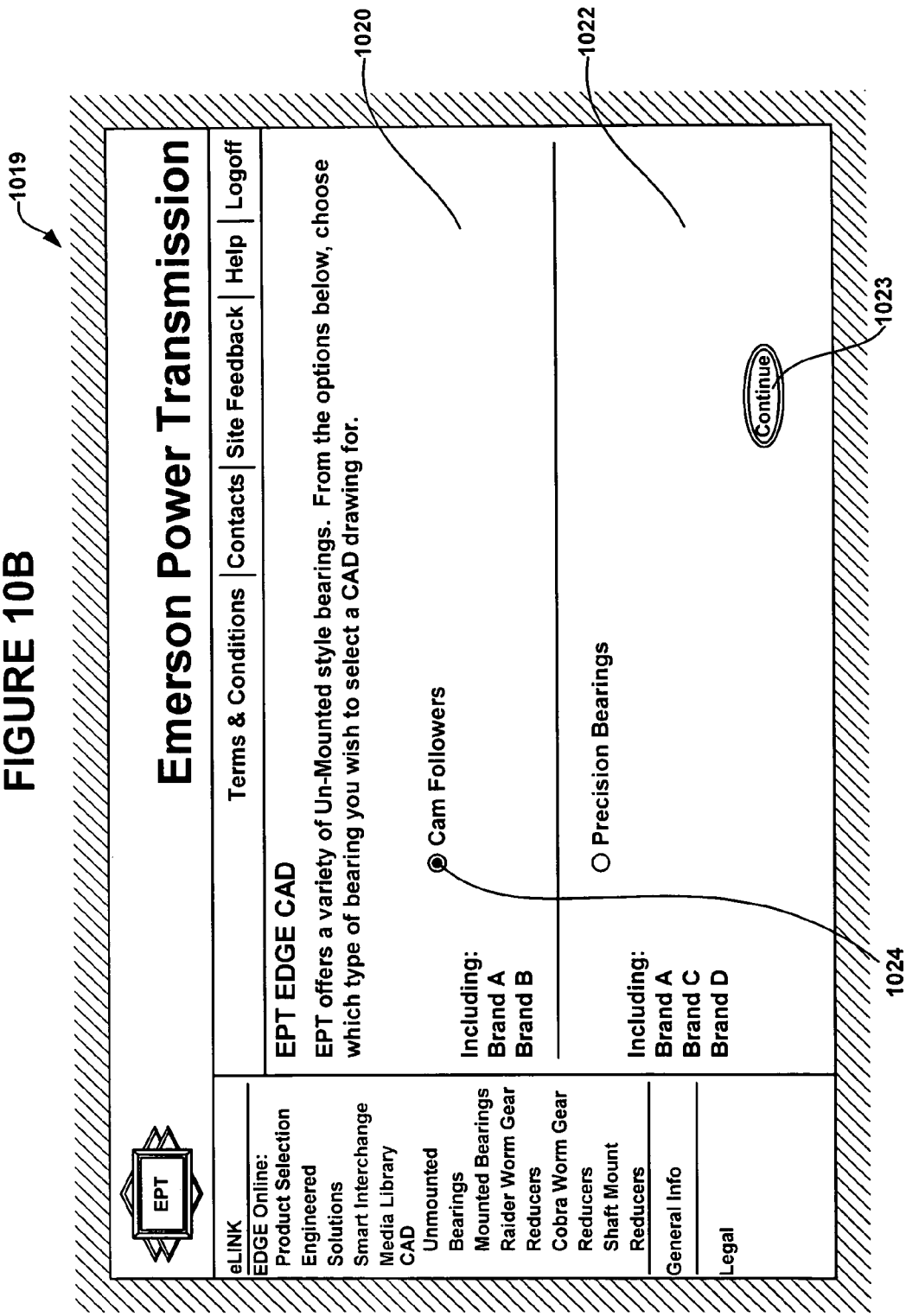
FIG. 10b is an illustration of a computer screen display as offered by a particular embodiment of the drawing display subsystem 108 after icon 1006 of FIG. 10a has been selected in accordance with the present invention.

FIG. 10b is an illustration of a computer screen display 1019 as offered by a particular embodiment of the drawing display subsystem 108 after icon 1006 of FIG. 10a has been selected in accordance with the present invention. In this example, the computer screen 1019 includes two rows 1020 and 1022. The row 1020 represents cam followers and the row 1022 represents precision bearings. The row 1020 includes a selection field 1024 where the user may select this field. A continue icon 1023 is used when the user desires to continue.

Figure 10C:
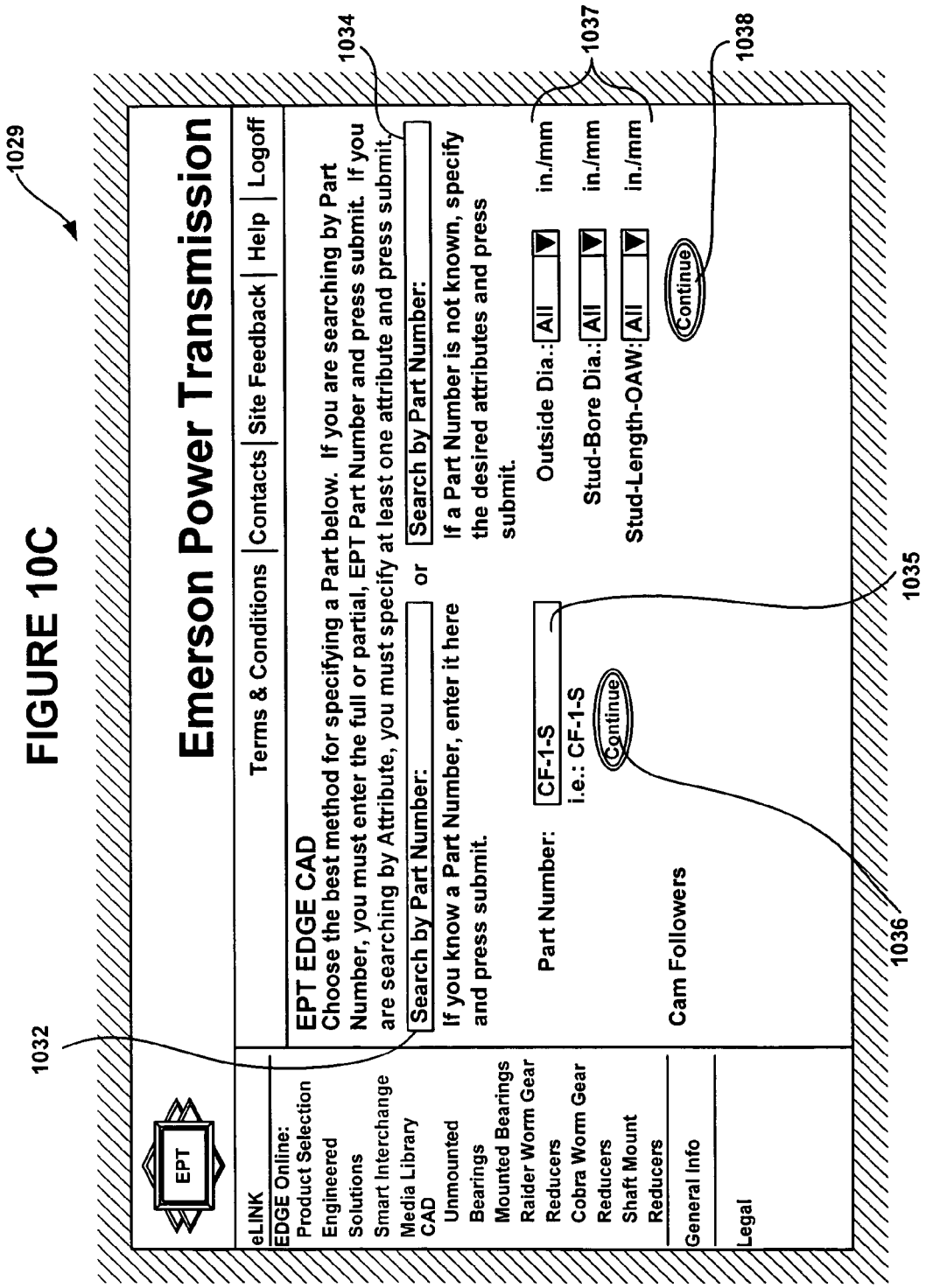
FIG. 10c is an illustration of a computer screen display as offered by a particular embodiment of the drawing display subsystem 108 after field 1024 of FIG. 10b has been selected and icon 1023 of FIG. 10b has been pressed in accordance with the present invention.

FIG. 10c is an illustration of a computer screen display 1029 as offered by a particular embodiment of the drawing display subsystem 108 after selection field 1024 of FIG. 10b has been selected and continue icon 1023 of FIG. 10b has been pressed in accordance with the present invention. The computer screen 1019 includes a search by part number column 1032 and a search by attribute column 1034. The search by part number column 1032 includes a part number field 1035 where the user may enter a part number. A continue icon 1036 may be pressed by the user after the part number has been entered. The search by attribute column 1034 includes a plurality of fields 1037 where the user may enter various parameters. A continue icon 1038 may be selected by the user when the user desires to continue.

FIG. 10d is an illustration of a computer screen display 1049 as offered by a particular embodiment of the drawing display subsystem 108 after field 1035 of FIG. 10c has been filed and after continue icon 1036 of FIG. 10c has been selected in accordance with the present invention. The computer screen 1049 includes a table 1050 with a list of part numbers. The part numbers may be icons and pressing the icons may cause the CAD drawing for the corresponding part to be downloaded from a database to the user and displayed. For example, icon 1052 represents the BCCF-1-S product, and selecting this icon causes CAD drawings related to the BCCF-1-S product to be displayed.

Figure 11A:
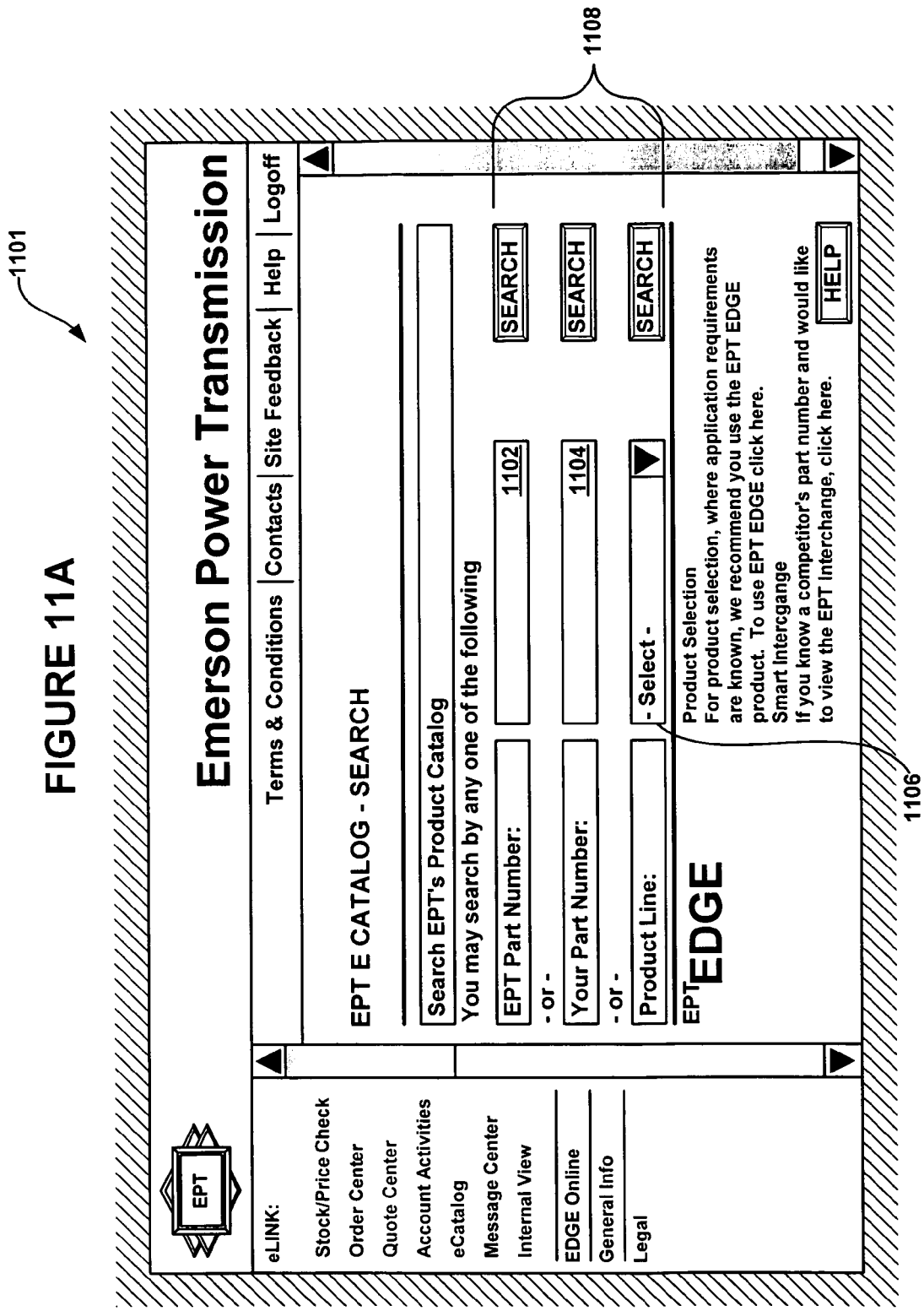
FIG. 11a is an illustration of a computer screen display as offered by a particular embodiment of the catalog subsystem 104 in accordance with the present invention.

FIG. 11a is an illustration of a computer screen display 1101 as offered by a particular embodiment of the catalog subsystem 104 in accordance with the present invention. The computer screen 1101 includes a plurality of search fields 1102, 1104 and 1106. The fields 1102 and 1104 may be filled with search terms, for example, part numbers. The field 1106 may be filled with product lines from a pull-down menu. A search icon 1108 may be used to request the system search for the terms in the fields 1102, 1104, and 1106.

Figure 11B:
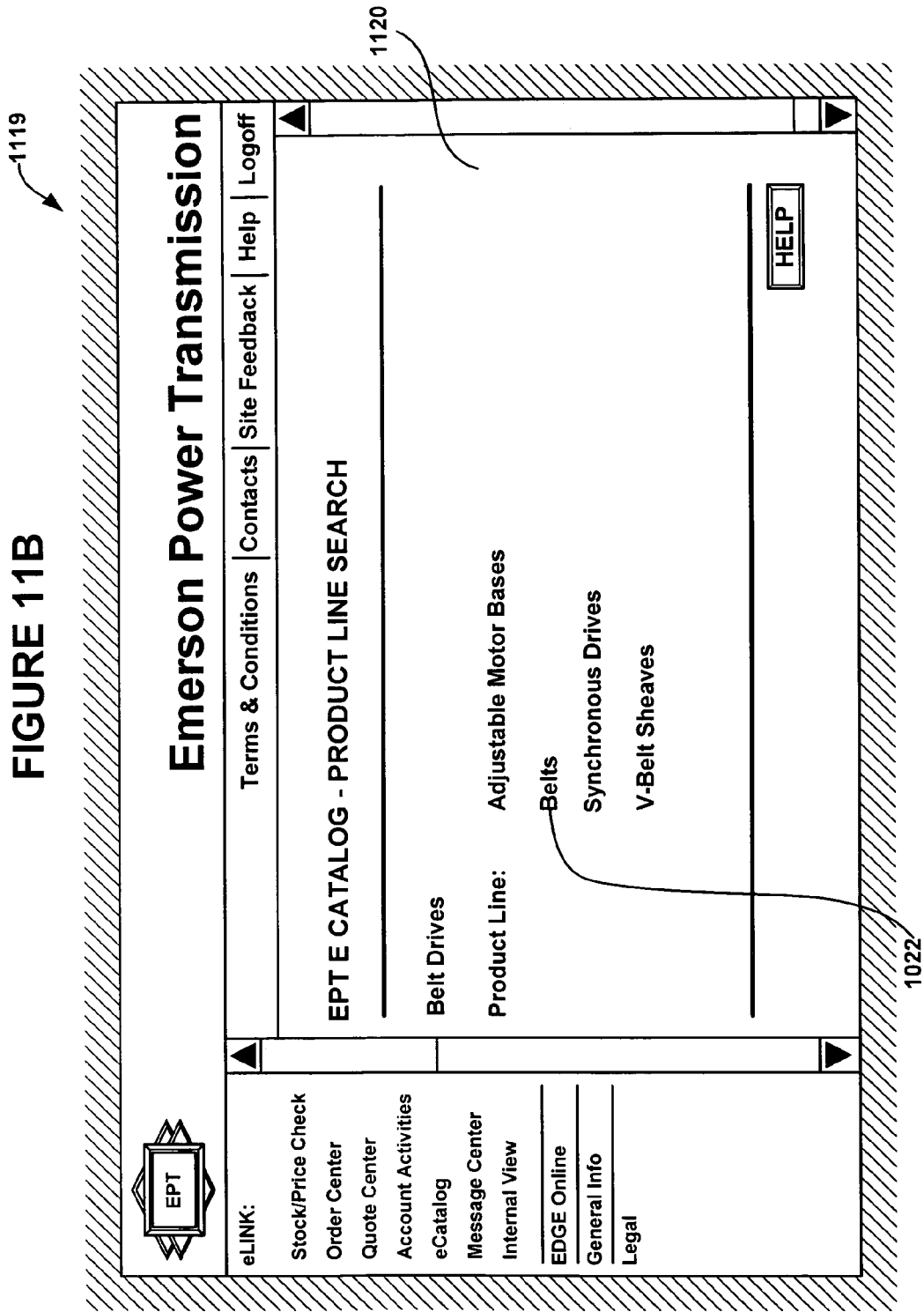
FIG. 11b is an illustration of a computer screen display as offered by a particular embodiment of the catalog subsystem 104 after icon 1106 of FIG. 11a has been filled and the search icon 1108 of FIG. 11a of FIG. 11a selected in accordance with the present invention.

FIG. 11b is an illustration of a computer screen display 1119 as offered by a particular embodiment of the catalog subsystem 104 after icon 1106 of FIG. 11a has been filled and the search icon 1108 of FIG. 11a of FIG. 11a selected in accordance with the present invention. The computer screen 1119 includes a product line field 1120 include a plurality of product types. Each of the product types may be an icon that is selectable by the user. Clicking on the option causes the system to display further information about the product line. For example, an icon 1122 represents the Belts product line type.

Figure 11C:
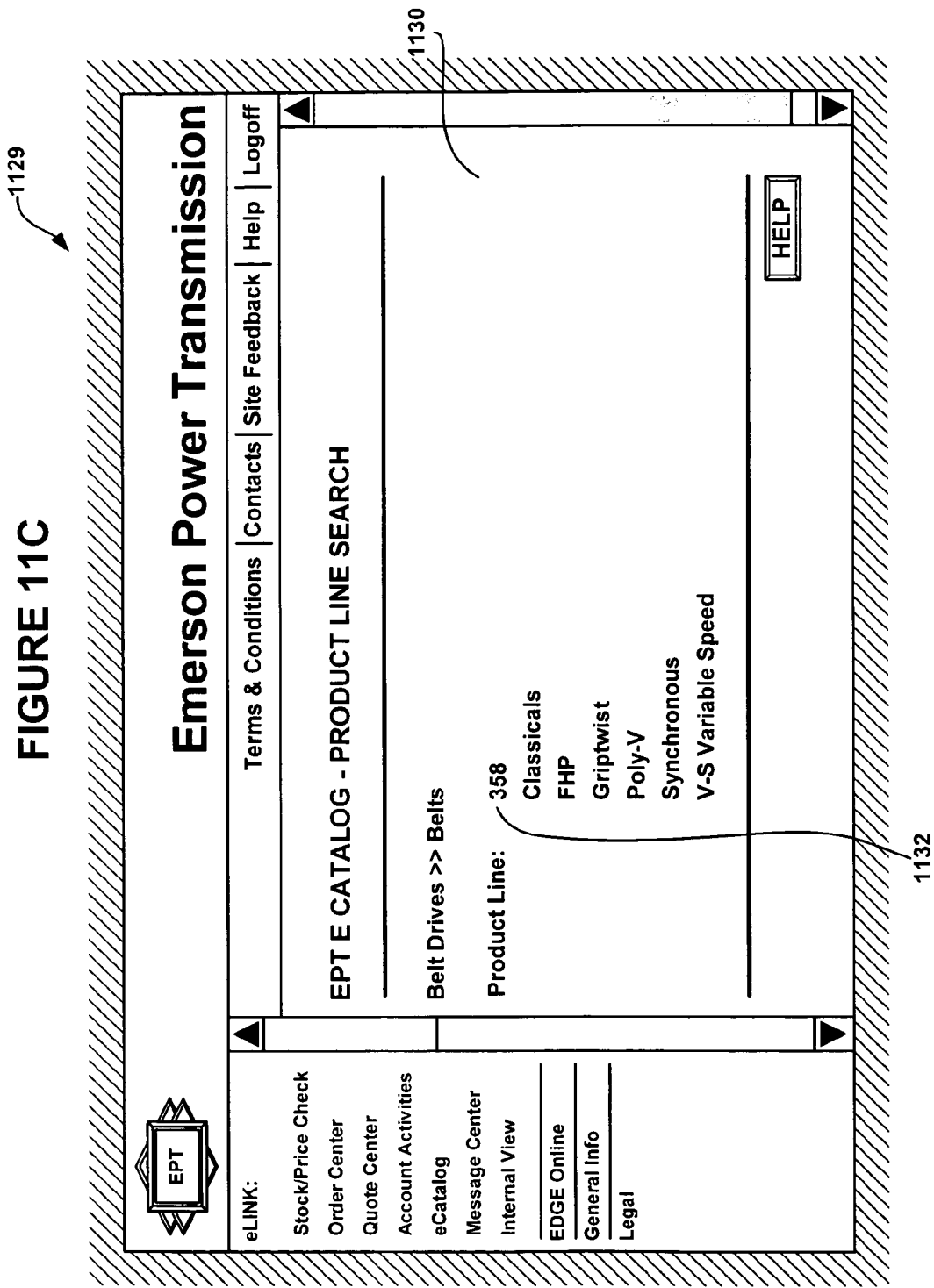
FIG. 11c is an illustration of a computer screen display as offered by a particular embodiment of the catalog subsystem 1022 after icon 1162 of FIG. 11b has been selected in accordance with the present invention.

FIG. 11c is an illustration of a computer screen display 1129 as offered by a particular embodiment of the catalog subsystem 104 after icon 1122 of FIG. 11b has been selected in accordance with the present invention. The computer screen 1129 includes a product line area 1130 that includes a plurality of product types. Each of the product types may be an icon that is selectable by the user. Clicking on the option causes the system to display further information about the product line. For example, an icon 1132 represents the 358 product line type.

Figure 11D:
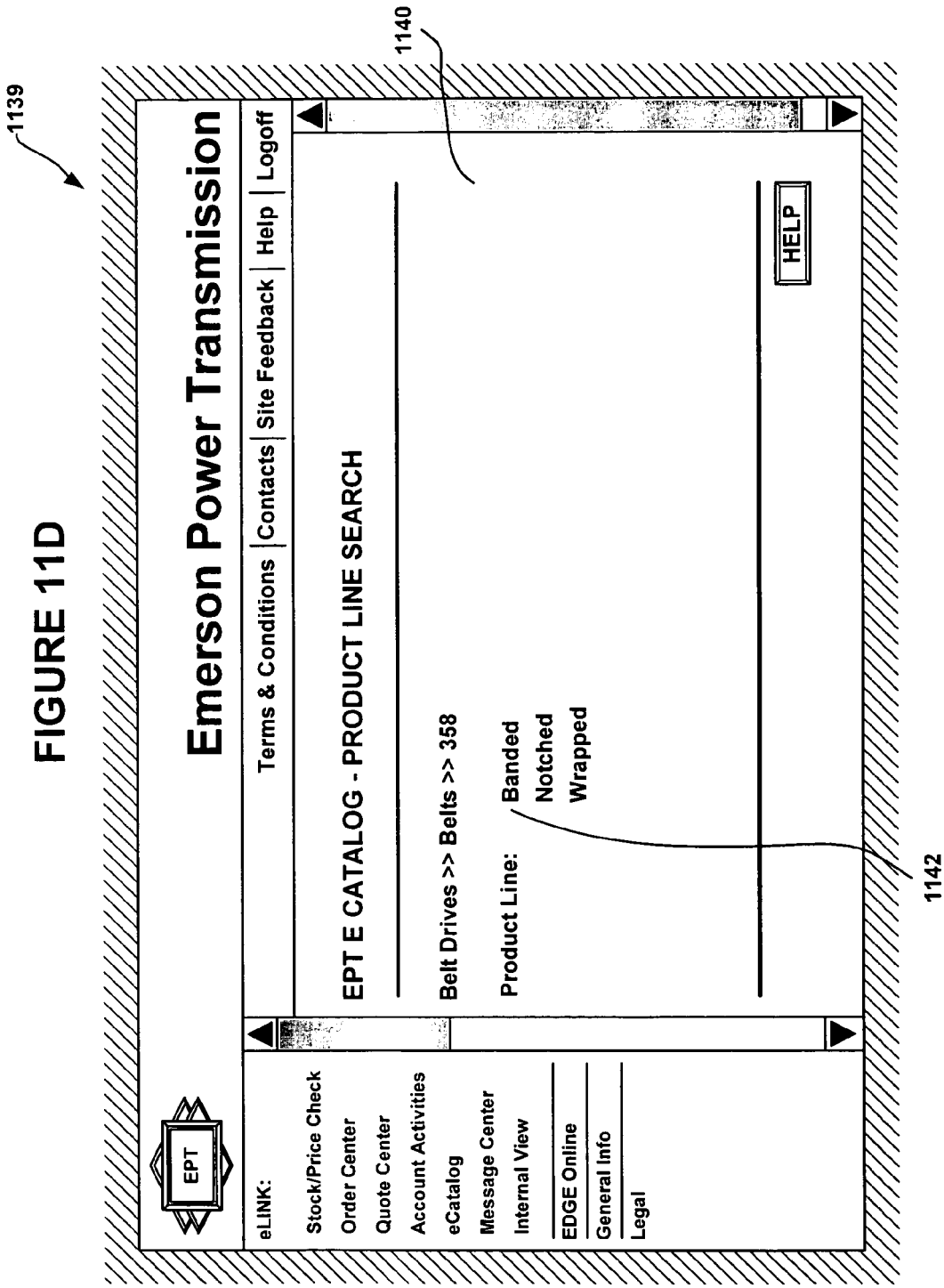
FIG. 11d is an illustration of a computer screen display as offered by a particular embodiment of the catalog subsystem 104 after icon 1132 of FIG. 11c has been selected in accordance with the present invention.

FIG. 11d is an illustration of a computer screen display 1139 as offered by a particular embodiment of the catalog subsystem 104 after icon 1132 of FIG. 11c has been selected in accordance with the present invention. The computer screen 1139 includes a product line area 1140 that includes a plurality of product types. Each of the product types may be an icon that is selectable by the user. Clicking on the option causes the system to display further information about the product line. For example, an icon 1142 represents the "Banded" product line type.

Figure 11E:
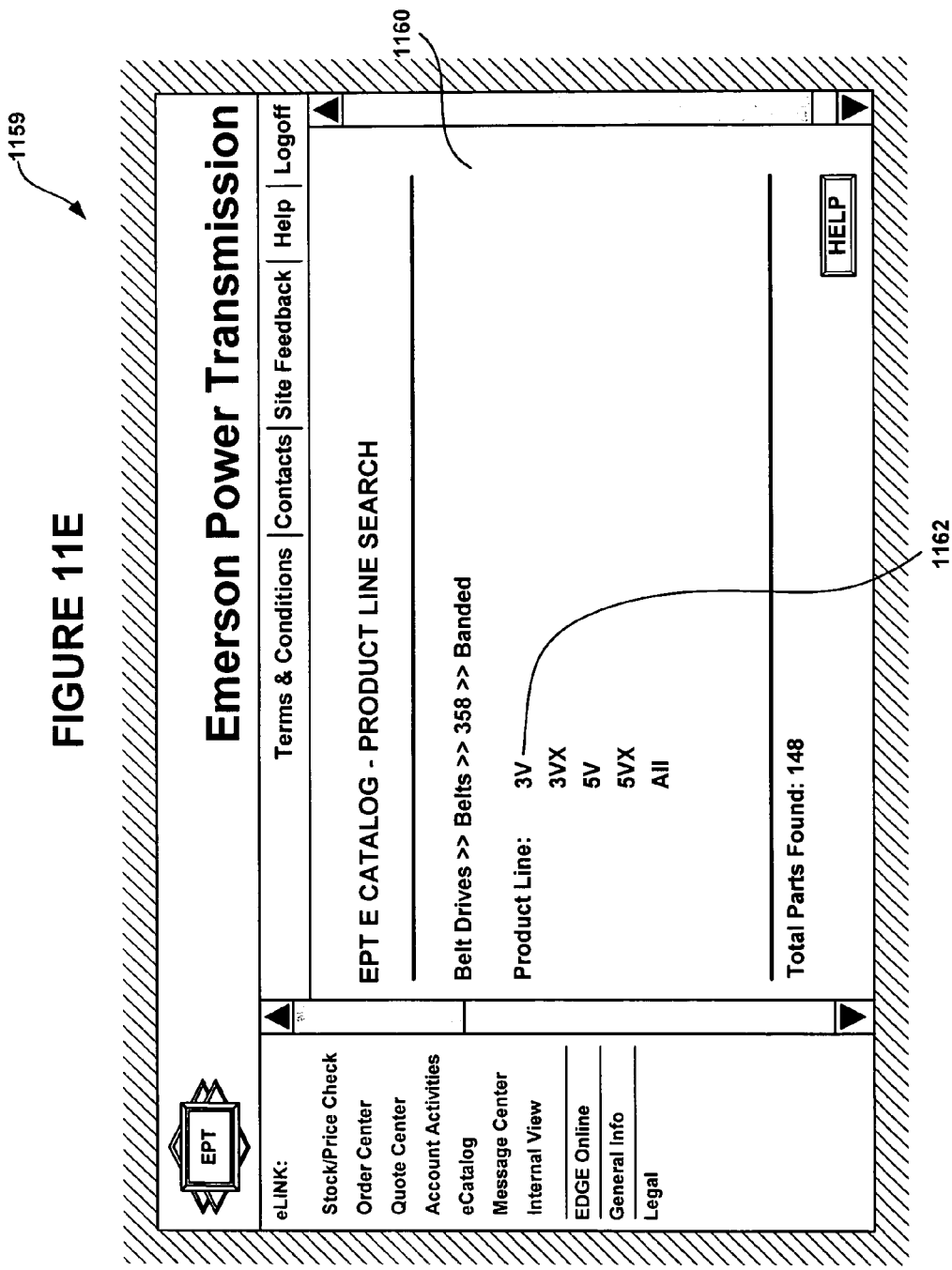
FIG. 11e is an illustration of a computer screen display as offered by a particular embodiment of the catalog subsystem 104 after icon 1142 of FIG. 11d has been selected in accordance with the present invention.

FIG. 11e is an illustration of a computer screen display 1159 as offered by a particular embodiment of the catalog subsystem 104 after icon 1142 of FIG. 11d has been selected in accordance with the present invention. The screen includes a belt section area 1160 that includes a plurality of product types. Each of the product types may be an icon that is selectable by the user. Clicking on the option causes the system to display further information about the product line. For example, an icon 1162 represents the 3V belt section.

Figure 11F:
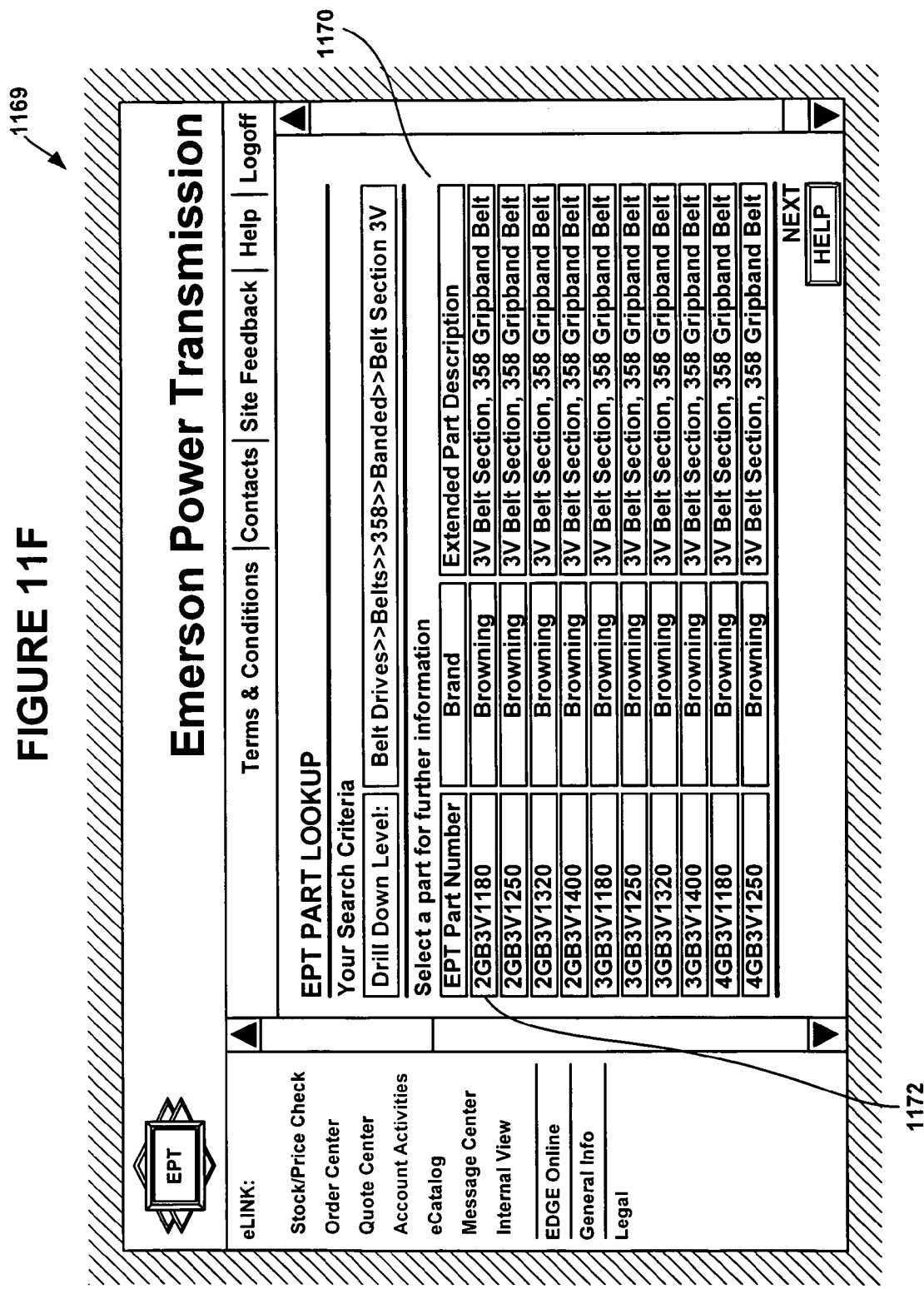
FIG. 11f is an illustration of a computer screen display as offered by a particular embodiment of the catalog subsystem 104 after icon 1162 of FIG. 11e has been selected in accordance with the present invention.

FIG. 11f is an illustration of a computer screen display 1169 as offered by a particular embodiment of the catalog subsystem 104 after icon 1162 of FIG. 11e has been selected in accordance with the present invention. The computer screen 1169 includes a product area 1170 that includes a plurality of products by part number. Each of the product types may be an icon that is selectable by the user. Clicking on the option causes the system to display further information about the product line. For example, an icon 1172 represents the 2 GB3V1180 product.

Figure 11G:
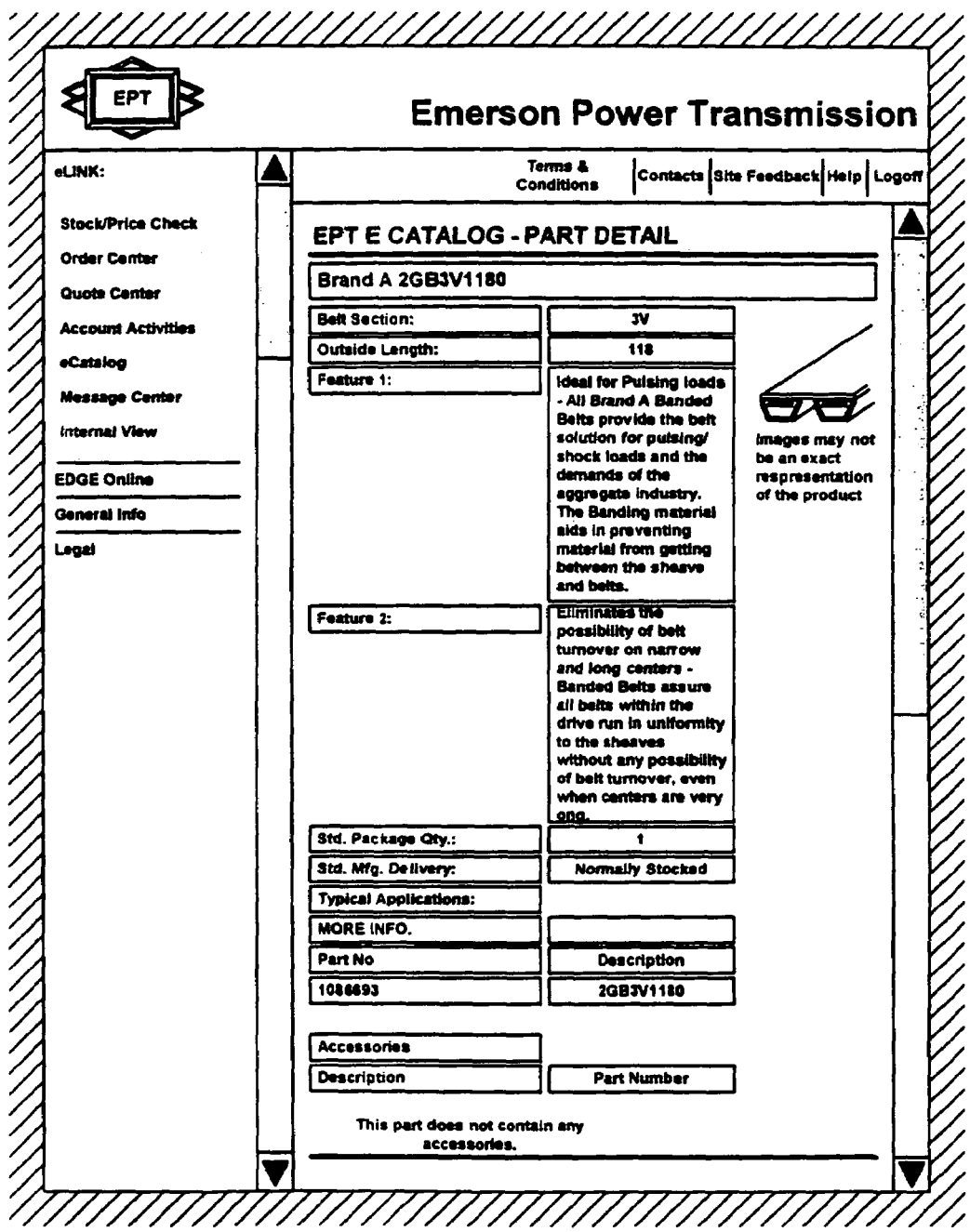
FIG. 11g is an illustration of a computer screen display as offered by a particular embodiment of the catalog subsystem 104 after icon 1172 has been selected in FIG. 11f in accordance with the present invention.

FIG. 11g is an illustration of a computer screen display 1180 as offered by a particular embodiment of the catalog subsystem 104 after icon 1172 has been selected in FIG. 11f in accordance with the present invention. The screen 1180 includes a variety of information about the selected part. In this example, the screen 1180 includes features of the product, package quantity, and availability. Other types of information are possible.

Figure 13A:
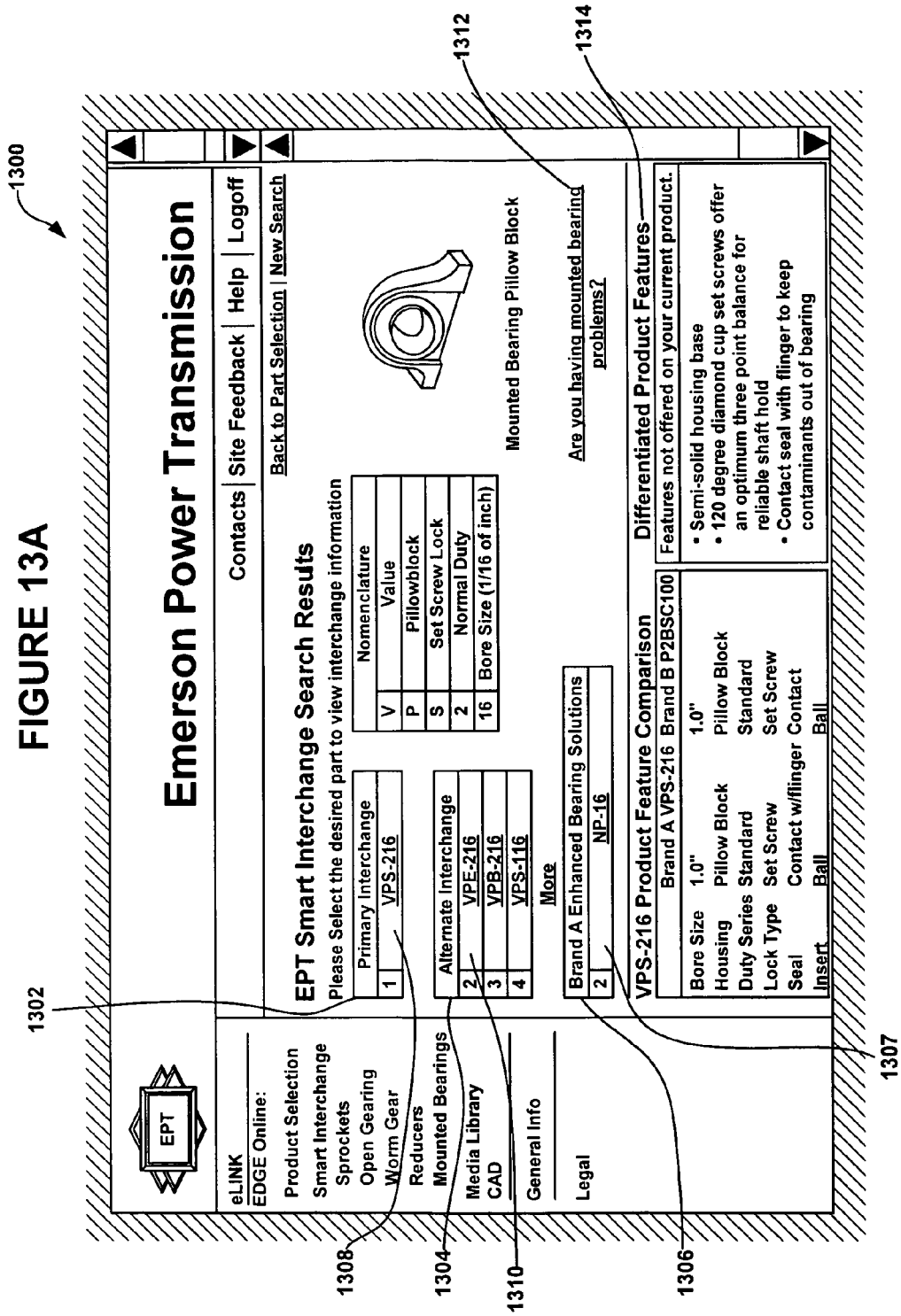
FIG. 13a is an illustration of a computer screen display as offered by a particular embodiment of the interchanger subsystem 106 in accordance with the present invention.

FIG. 13a is an illustration of a computer screen display 1300 as offered by a particular embodiment of the interchanger subsystem 106 in accordance with the present invention. The computer screen 1300 is shown after the user has used other screens to specify the identity of the product of the competitor that the user wishes to obtain a substitute product.

The computer screen 1300 includes a primary interchange product field 1302, an alternate product interchange field 1304, and an enhanced solutions field 1306. The primary interchange product field 1302 shows a product or products that meet the minimum requirements of the user. The alternate product interchange field 1304 shows a product or products that also meet the minimum requirements of the user. The enhanced solutions field 1306 shows a product or products that not only meets the minimum requirements of the user and may exceed all or some of these requirements and/or offer additional features that may be of interest to the user. Each of the products may be an icon or hyperlink. For example, fields 1308, 1310, and 1307 may be hyperlinks to the respective products shown.

A field 1312 may be used as a problem indication hyperlink. The field 1312 may be selected if the user is having problems with a product and desires additional information about the product. A field 1314 may include information concerning the primary interchange product and compare features of this product with the product specified by the competitor.

Figure 13B:
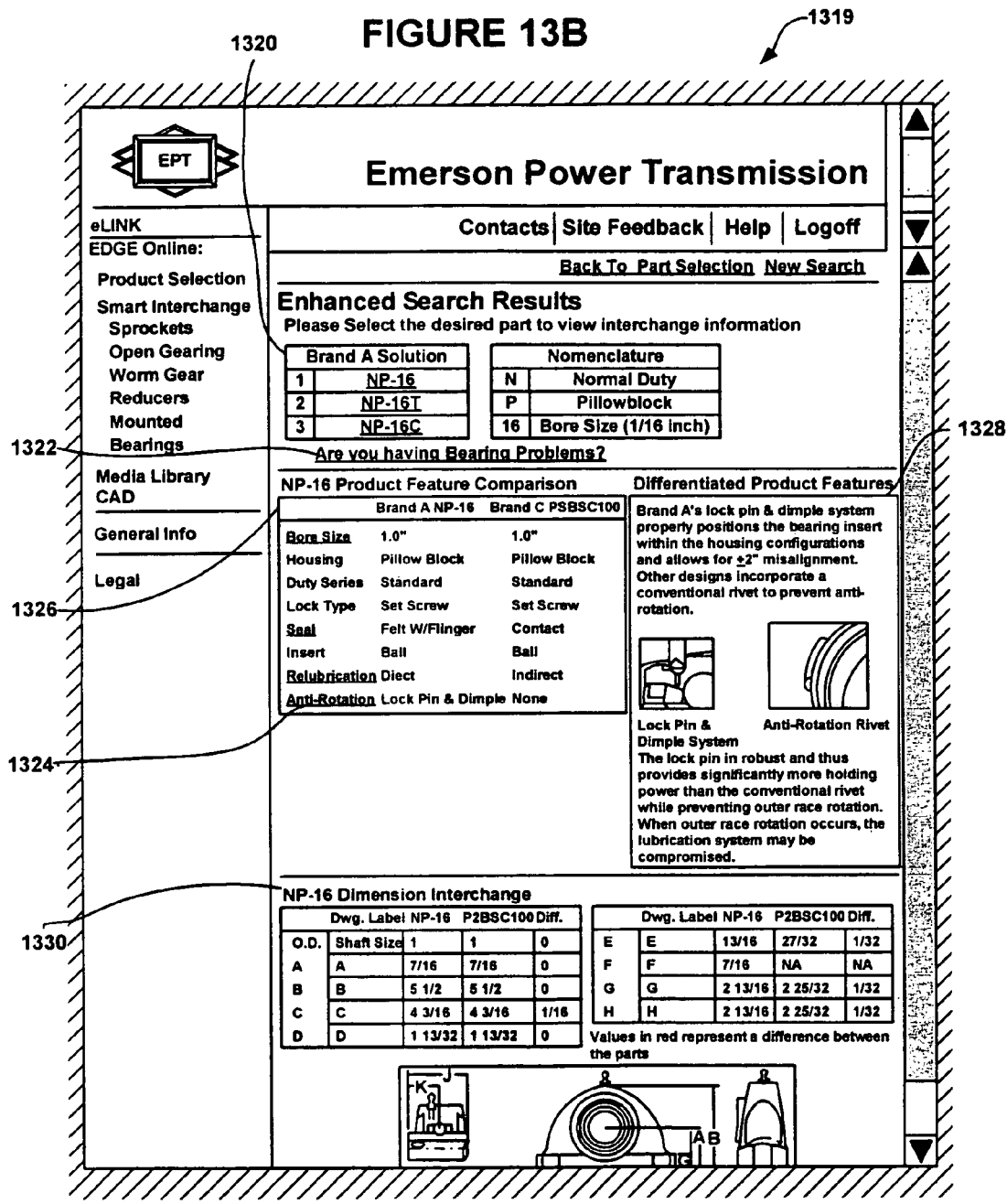
FIG. 13b is an illustration of a computer screen display as offered by a particular embodiment of the interchanger subsystem 106 after icon 1306 of FIG. 13a has been selected in accordance with the present invention.

FIG. 13b is an illustration of a computer screen display 1319 as offered by a particular embodiment of the interchanger subsystem 106 after icon 1306 of FIG. 13a has been selected in accordance with the present invention. The computer screen 1319 may include a solution column 1320.

The solution column 1320 may include a list of enhanced solutions. Each of the products may be a hyperlink. Pressing the hyperlink may cause additional information to be displayed about the selected product. For example, fields 1326 and 1328 may be used to display information about a product selected by the user. The field 1326 may display product features and include hyperlinks, for example, the hyperlink 1324. Selecting the hyperlink 1324 may cause the field 1328 to be filled with information concerning the hyperlink. In one example, if the hyper link 1324 is "anti-rotation", then the field 1328 may include information concerning the anti-rotation features of the selected product, in this case, the NP-16. A field 1330 may include information comparing the dimensions of the substitute product with that of the product of the competitor. The above-mentioned fields are displayed based upon the product specified by the user. In other words, different fields may be displayed for different products.

Figure 13C:
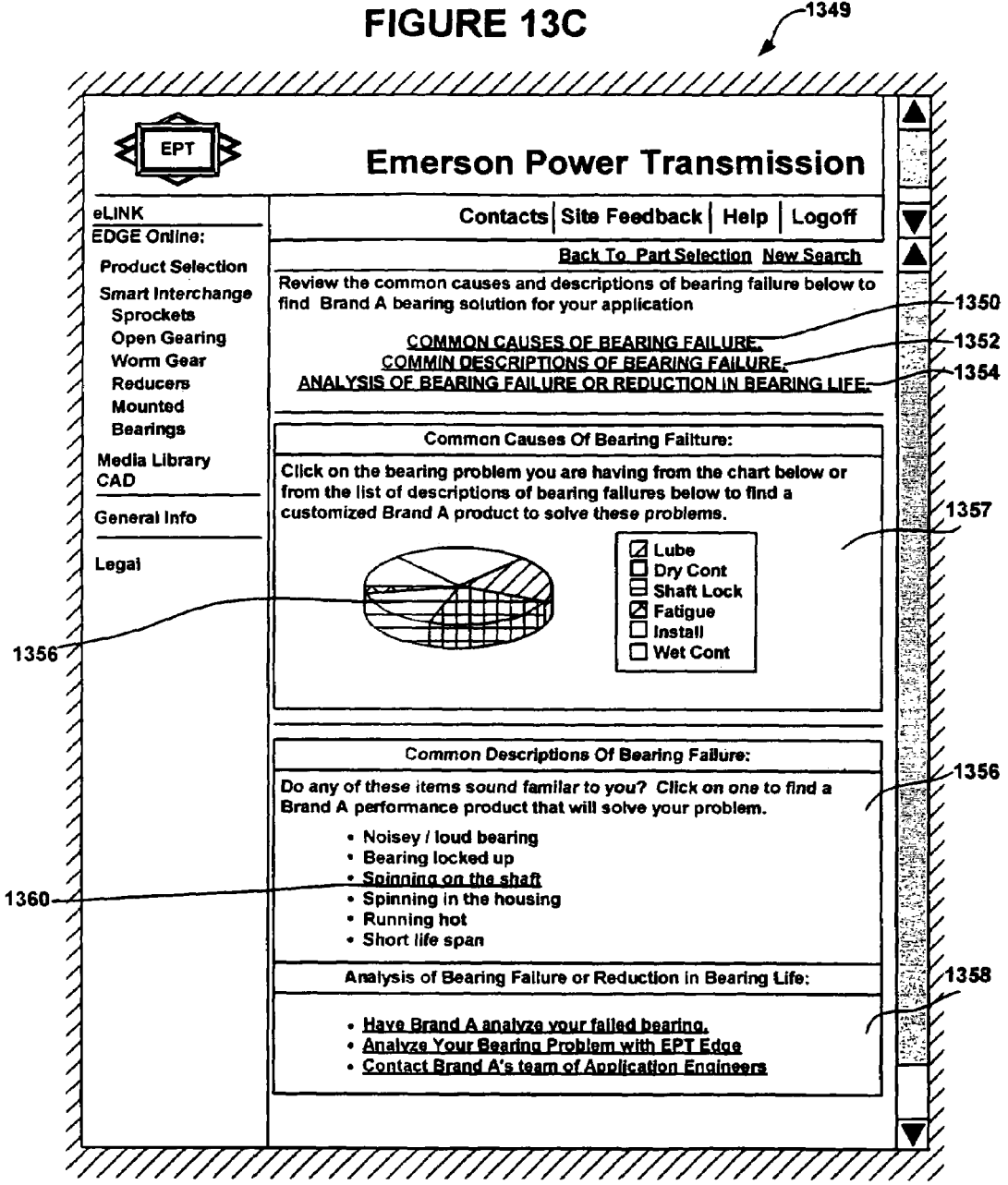
FIG. 13c is an illustration of a computer screen display as offered by a particular embodiment of the interchanger subsystem 106 after icon 1312 of FIG. 13a has been selected in accordance with the present invention.

FIG. 13c is an illustration of a computer screen display 1349 as offered by a particular embodiment of the interchanger subsystem 106 after icon 1312 of FIG. 13a has been selected in accordance with the present invention. The computer screen 1349 includes icons or hyperlinks 1350, 1352, and 1354. The hyperlinks 1350, 1352, and 1354 may be links to further information, respectively, concerning common causes of product failure, common descriptions for product failure (from customers), and analysis of product failure or reduction in product life. Selecting these hyperlinks causes fields 1357, 1356, and 1358 to display further information.

The field 1357 includes a pie chart including common causes of product failure. Portions of the pie chart may be hyperlinks that cause additional information concerning a particular reason for failure to be displayed. For example, a hyperlink 1356 may provide further information concerning dry contaminants.

The field 1356 may include common descriptions of product problems. Each of the descriptions may be a hyperlink. Pressing the hyperlink may provide additional information about the common description. For example, the hyperlink 1360 may relate to spinning on the shaft and pressing the hyperlink 1360 may provide additional information concerning spinning on the shaft.

The field 1358 indicates an analysis of product failure. For example, one entry may be a hyperlink where the contact a human operator for additional information or support.

Figure 13D:
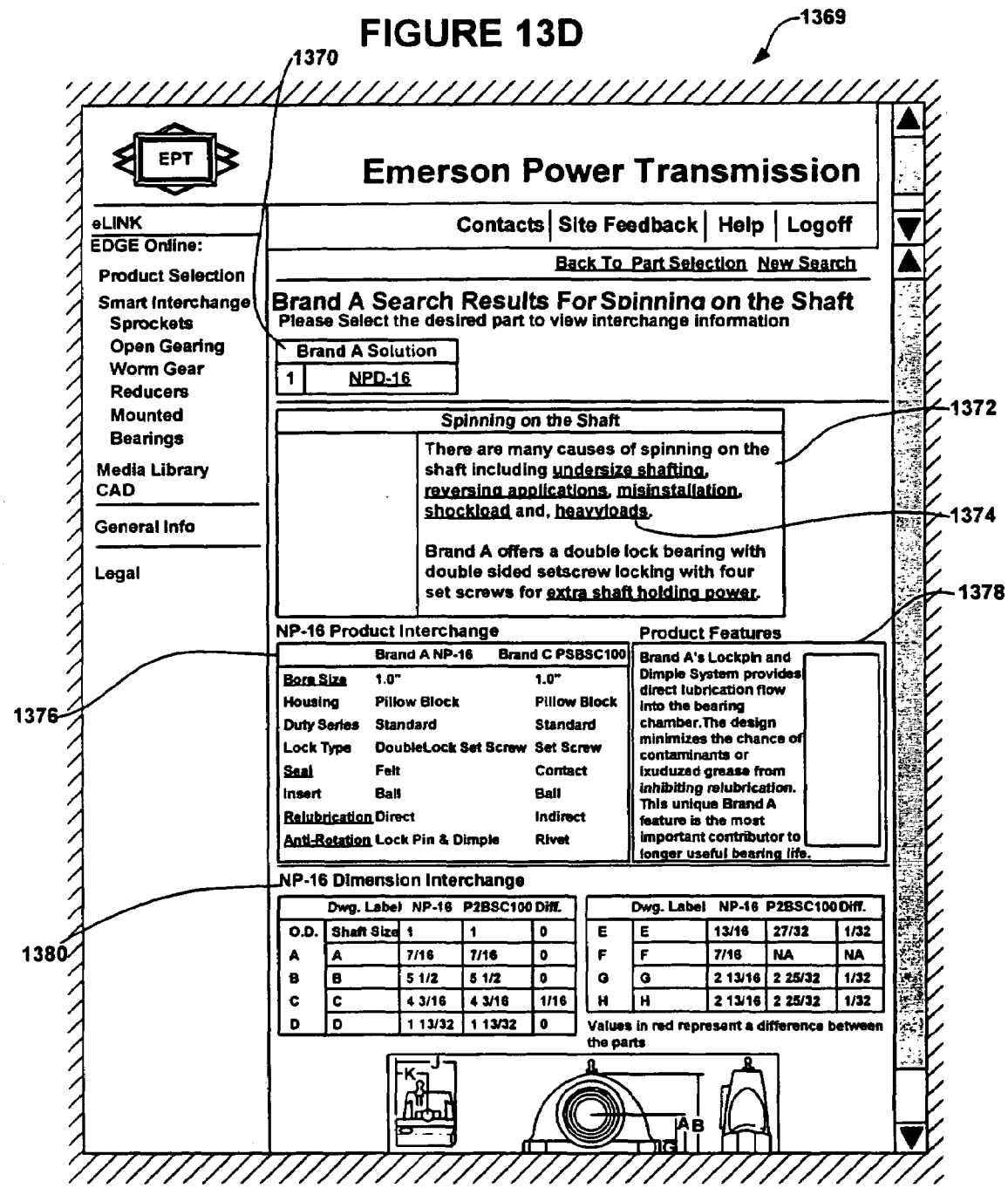
FIG. 13d is an illustration of a computer screen display as offered by a particular embodiment of the interchanger subsystem 106 after icon 1360 of FIG. 13c has been selected in accordance with the present invention.

FIG. 13d is an illustration of a computer screen display 1369 as offered by a particular embodiment of the interchanger subsystem 106 after icon 1360 of FIG. 13c has been selected in accordance with the present invention. The computer screen 1369 may include a hyperlink 1370 offering a solution that addresses the problem selected by the user. A field 1372 may provide causes of the problem selected by the user, in this case, spinning on the shaft. The field 1372 may include other problems, which themselves be hyperlinks, providing additional information.

A field 1376 may provide information about the solution product indicated by field 1370. A field 1378 may include features of this product and how this product addresses the problem selected by the user (e.g., spinning on the shaft). A field 1380 may include a comparison of dimensions between the substitute product and the product of the competitor specified by the user.

Figure 13E:
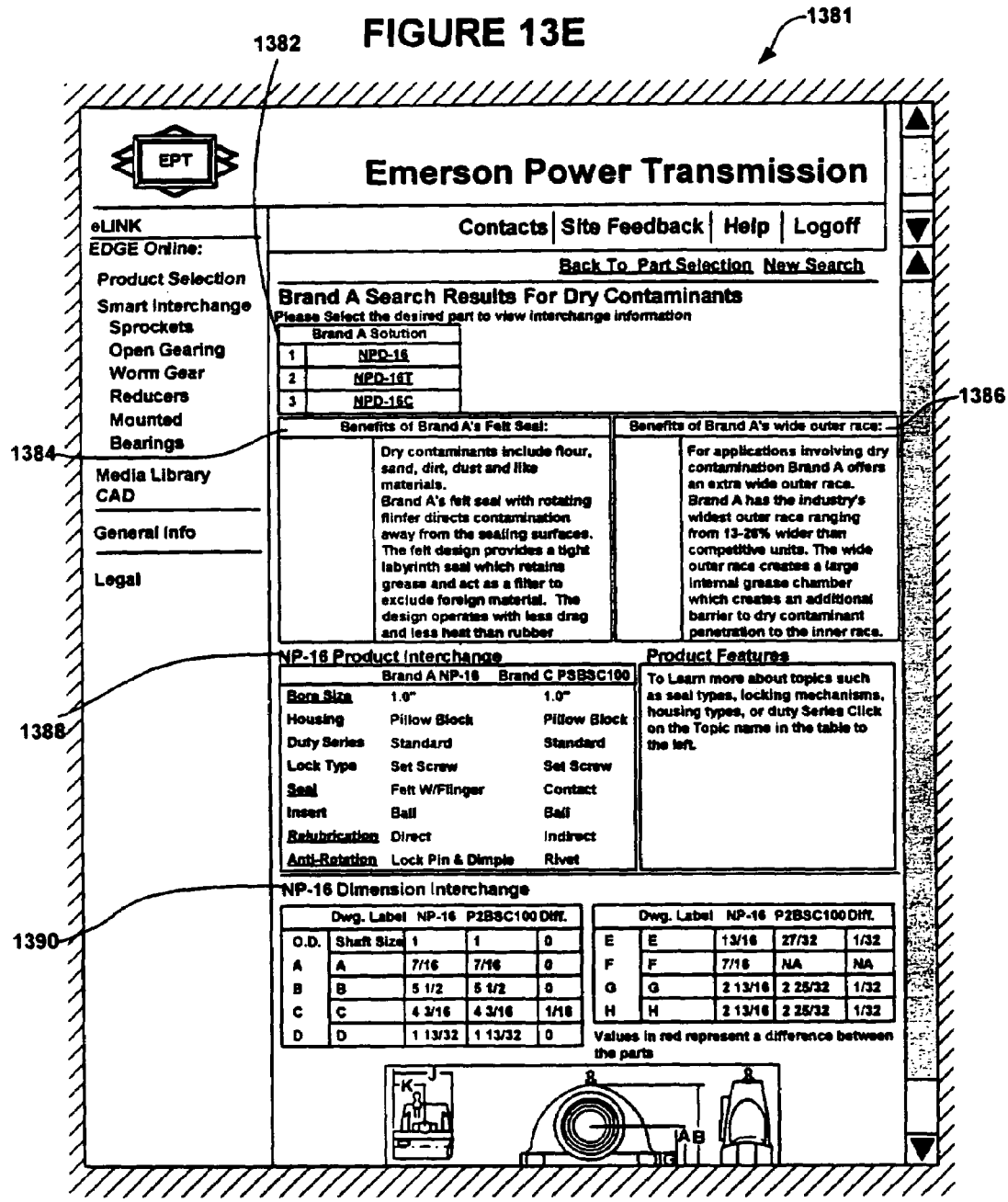
FIG. 13e is an illustration of a computer screen display as offered by a particular embodiment of the interchanger subsystem 106 after icon 1356 of FIG. 13c has been selected in accordance with the present invention.

FIG. 13e is an illustration of a computer screen display 1381 as offered by a particular embodiment of the interchanger subsystem 106 after icon 1356 of FIG. 13c has been selected in accordance with the present invention. The computer screen 1381 includes a product field 1382 where products that address the concern of the user (e.g., dry contaminants) are listed. Each of the products may be a hyperlink and selecting the hyperlink may provide additional information about the product. A field 1384 may provide benefit information concerning any of the products listed in field 1382. A field 1386 may provide additional benefit information concerning any of the products listed in field 1382. A field 1388 may include a comparison of the features of a product in field 1382 and the competitor part. A field 1390 may include a comparison of the dimensions of a product in field 1382 and the competitor part.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for power transmission system information retrieval and component ordering may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A system for providing a comparison of parts to facilitate part selection, comprising in combination:
    a processor;
    data storage; and
    instructions stored in the data storage executable by the processor, in response to a user providing information regarding a first part, to:
    display a first list of features of the first part;
    select at least one substitute part that has similar features as the first part;
    display a corresponding list of features for the substitute part selected;
    compare the first list and the corresponding list; and
    provide an indication to call attention to differences between a listed feature of the first part and a corresponding listed feature for the substitute part selected to allow for comparing of the first and substitute parts.

2. The system of claim 1, further comprising instructions to order the substitute part selected.

3. The system of claim 1, further comprising instructions to display a drawing.

4. The system of claim 1, wherein the information regarding the first part is selected from the group consisting of part number, part type, and part parameter.

5. The system of claim 1, further comprising instructions to calculate parameters for the substitute part selected.

6. The system of claim 1, further comprising instructions to rank the substitute parts if more than one substitute part is selected.

7. The system of claim 6, wherein the instructions rank the substitute parts based on how close the substitute part matches the first part or cost.

8. The system of claim 1, further comprising instructions to classify the at least one substitute part as a primary exchange product, an alternative exchange product, or an enhanced solution product.

9. The system of claim 8, wherein the at least one substitute part is classified as an enhanced solution product if the at least one substitute part has more features than the first part.

10. The system of claim 1, wherein the first part is a power transmission component.

11. The system of claim 1, wherein the first part is a drive, gearing, bearing, or coupling.

12. A system for providing a comparison of parts to facilitate part selection, comprising in combination:
    a processor;
    data storage; and
    instructions stored in the data storage executable by the processor, in response to a user providing information regarding a first part, to:
    display a first list of dimensions of the first part;
    select at least one substitute part that has similar dimensions as the first part;
    display a corresponding list of dimensions of the substitute part selected;
    compare the first list and the corresponding list; and
    provide an indication to call attention to differences between a listed dimension of the first part and a corresponding listed dimension for the substitute part selected to allow for comparing of the first and substitute parts.

13. The system of claim 12, further comprising instructions to order the substitute part selected.

14. The system of claim 12, further comprising instructions to display a drawing.

15. The system of claim 12, wherein the information regarding the first part is selected from the group consisting of part number, part type, and part parameter.

16. The system of claim 12, further comprising instructions to calculate parameters for the substitute part selected.

17. The system of claim 12, further comprising instructions to rank the substitute parts if more than one substitute part is selected.

18. The system of claim 17, wherein the instructions rank the substitute parts based on how close the substitute part matches the first part or cost.

19. The system of claim 12, further comprising instructions to classify the at least one substitute part as a primary exchange product, an alternative exchange product, or an enhanced solution product.

20. The system of claim 19, wherein the at least one substitute part is classified as an enhanced solution product if the at least one substitute part has more features than the first part.

21. The system of claim 12, wherein the first part is a power transmission component.

22. The system of claim 12, wherein the first part is a drive, gearing, bearing, or coupling.

23. A method for providing a comparison of parts to facilitate part selection, comprising in combination:
- displaying a first list of features of a first part;
- selecting at least one substitute part that has similar features as the first part;
- displaying a corresponding list of features for the substitute part selected;
- comparing the first list and the corresponding list; and
- providing an indication to call attention to differences between a listed feature of the first part and a corresponding listed feature for the substitute part selected to allow for comparing of the first and substitute parts.

24. The method of claim 23, further comprising ordering the substitute part selected.

25. The method of claim 23, further comprising displaying a drawing.

26. The method of claim 23, further comprising calculating parameters for the substitute part selected.

27. The method of claim 23, further comprising ranking the substitute parts if more than one substitute part is selected.

28. The method of claim 27, wherein ranking the substitute parts is based on how close the substitute part matches the first part or cost.

29. The method of claim 23, further comprising classifying the at least one substitute part as a primary exchange product, an alternative exchange product, or an enhanced solution product.

30. The method of claim 29, wherein the at least one substitute part is classified as an enhanced solution product if the at least one substitute part has more features than the first part.

31. The method of claim 23, wherein the first part is a power transmission component.

32. The method of claim 23, wherein the first part is a drive, gearing, bearing, or coupling.

33. A method for providing a comparison of parts to facilitate part selection, comprising in combination:
- displaying a first list of dimensions of a first part;
- selecting at least one substitute part that has similar dimensions as the first part;
- displaying a corresponding list of dimensions for the substitute part selected;
- comparing the first list and the corresponding list; and
- providing an indication to call attention to differences between a listed dimension of the first part and a corresponding listed dimension for the substitute part selected to allow for comparing of the first and substitute parts.

34. The method of claim 33, further comprising ordering the substitute part selected.

35. The method of claim 33, further comprising displaying a drawing.

36. The method of claim 33, further comprising calculating parameters for the substitute part selected.

37. The method of claim 33, further comprising ranking the substitute parts if more than one substitute part is selected.

38. The method of claim 37, wherein the ranking of the substitute parts is based on how close the substitute part matches the first part or cost.

39. The method of claim 33, further comprising classifying the at least one substitute part as a primary exchange product, an alternative exchange product, or an enhanced solution product.

40. The method of claim 39, wherein the at least one substitute part is classified as an enhanced solution product if the at least one substitute part has more features than the first part.

41. The method of claim 33, wherein the first part is a power transmission component.

42. The method of claim 33, wherein the first part is a drive, gearing, bearing, or coupling.

* * * * *